US012619312B2

(12) United States Patent
    Kadowaki et al.

(10) Patent No.: US 12,619,312 B2
(45) Date of Patent: May 5, 2026

(54) SYSTEM INCLUDING PEN AND PEN POSITION DETECTION APPARATUS, PEN POSITION DETECTION APPARATUS, AND METHOD OF ACTIVATING HAPTIC ELEMENT BUILT IN PEN

(71) Applicant: Wacom Co., Ltd., Saitama (JP)

(72) Inventors: Jun Kadowaki, Saitama (JP); Kizuku Ishimaru, Saitama (JP); Mu-Tzu Chen, Saitama (JP); Noboru Yamaguchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 9 days.

(21) Appl. No.: 18/799,321

(22) Filed: Aug. 9, 2024

(65) Prior Publication Data

US 2024/0402817 A1 Dec. 5, 2024

Related U.S. Application Data

(63) Continuation of application No. PCT/JP2023/001554, filed on Jan. 19, 2023.

(30) Foreign Application Priority Data

Feb. 21, 2022 (JP) ................................. 2022-024461

(51) Int. Cl.
    *G06F 3/01* (2006.01)
    *G06F 3/0354* (2013.01)
    (Continued)

(52) U.S. Cl.
    CPC .......... *G06F 3/016* (2013.01); *G06F 3/03545* (2013.01); *G06F 3/0383* (2013.01); *G06F 3/04162* (2019.05)

(58) Field of Classification Search
    CPC .... G06F 3/016; G06F 3/03545; G06F 3/0383; G06F 3/04162; G06F 3/01; G06F 3/03; (Continued)

(56) References Cited

U.S. PATENT DOCUMENTS 7,508,382 B2 * 3/2009 Denoue .................. G06F 3/016
                                                                345/173
8,253,686 B2 * 8/2012 Kyung ................ G06F 3/03545
                                                                345/173
(Continued)

FOREIGN PATENT DOCUMENTS

JP     2002-259044 A     9/2002
JP     2009-238081 A     10/2009
       (Continued)

OTHER PUBLICATIONS

English Translation of the International Search Report for International Application No. PCT/JP2023/001554, mailed Apr. 11, 2023. (2 pages).

*Primary Examiner* — Benyam Ketema
(74) *Attorney, Agent, or Firm* — Seed Intellectual Property Law Group LLP

(57) ABSTRACT

A system includes a pen and a pen position detection apparatus. The pen includes a signal transmitter that transmits a pen signal, a signal receiver that receives a vibration control signal, and a haptic element that is activated in response to the vibration control signal. The pen position detection apparatus is configured to detect the pen signal to derive a pen position, detect occurrence of an event that a drawing line indicated by a series of derived pen positions crosses or comes into contact with a predetermined line segment, and transmit the vibration control signal to activate the haptic element in response to the detection of the occurrence of the event.

20 Claims, 18 Drawing Sheets

(51) Int. Cl.
G06F 3/038 (2013.01)
G06F 3/041 (2006.01)

(58) Field of Classification Search
CPC ........ G06F 3/0354; G06F 3/038; G06F 3/041;
G06F 3/044; G06F 3/04883
See application file for complete search history.

(56) References Cited

U.S. PATENT DOCUMENTS

| | | | | |
|---|---|---|---|---|
| 9,468,846 | B2 * | 10/2016 | Terrell | A63F 13/24 |
| 10,120,446 | B2 * | 11/2018 | Pance | G06F 3/041 |
| 10,338,725 | B2 * | 7/2019 | Tu | G06F 3/0416 |
| 10,671,186 | B2 * | 6/2020 | Ribeiro | G06F 3/016 |
| 11,132,073 | B1 * | 9/2021 | Lin | G06F 3/03545 |
| 2002/0163510 | A1 * | 11/2002 | Williams | G06F 3/04883 |
| | | | | 345/179 |
| 2002/0181744 | A1 * | 12/2002 | Vablais | G06V 10/17 |
| | | | | 382/107 |
| 2003/0128195 | A1 * | 7/2003 | Banerjee | G06F 3/038 |
| | | | | 345/179 |
| 2005/0110778 | A1 * | 5/2005 | Ben Ayed | G06F 3/03545 |
| | | | | 345/179 |
| 2005/0248549 | A1 * | 11/2005 | Dietz | G06F 3/03545 |
| | | | | 345/179 |
| 2008/0169132 | A1 * | 7/2008 | Ding | G06F 3/04162 |
| | | | | 178/19.02 |
| 2009/0167702 | A1 * | 7/2009 | Nurmi | G06F 3/04883 |
| | | | | 345/173 |
| 2009/0190808 | A1 * | 7/2009 | Claus | A61B 3/0041 |
| | | | | 382/128 |
| 2012/0068964 | A1 * | 3/2012 | Wright | G06F 3/0442 |
| | | | | 345/174 |
| 2012/0127088 | A1 * | 5/2012 | Pance | G06F 3/04812 |
| | | | | 345/173 |
| 2013/0009907 | A1 * | 1/2013 | Rosenberg | G06F 3/046 |
| | | | | 345/174 |
| 2013/0207938 | A1 * | 8/2013 | Ryshtun | G06F 3/0441 |
| | | | | 178/19.03 |
| 2013/0307829 | A1 * | 11/2013 | Libin | G06F 3/016 |
| | | | | 345/179 |
| 2014/0043242 | A1 | 2/2014 | Dietz et al. | |
| 2015/0116236 | A1 * | 4/2015 | Kim | G06F 3/038 |
| | | | | 345/173 |
| 2016/0092021 | A1 | 3/2016 | Tu et al. | |
| 2016/0282970 | A1 * | 9/2016 | Evreinov | G06F 3/0383 |
| 2017/0336903 | A1 * | 11/2017 | Rivaud | G06F 3/04886 |
| 2017/0364167 | A1 * | 12/2017 | Ribeiro | G06F 3/0442 |
| 2019/0094974 | A1 * | 3/2019 | Hayashi | G06F 3/03545 |
| 2020/0174589 | A1 * | 6/2020 | Hara | G06F 3/03545 |
| 2020/0201509 | A1 * | 6/2020 | Kadowaki | G06F 3/03545 |
| 2020/0241698 | A1 * | 7/2020 | Kadowaki | G06F 3/03545 |
| 2021/0089146 | A1 * | 3/2021 | Hashimoto | G06F 3/04162 |
| 2021/0223875 | A1 | 7/2021 | Nomura et al. | |
| 2021/0311551 | A1 * | 10/2021 | Wong | G06V 30/19007 |
| 2022/0066728 | A1 * | 3/2022 | Oshima | G06F 1/1641 |
| 2022/0164086 | A1 * | 5/2022 | Kadowaki | G06F 3/03546 |
| 2023/0004234 | A1 * | 1/2023 | Jung | G06F 3/041 |
| 2023/0221815 | A1 * | 7/2023 | Ide | G06F 3/02 |
| | | | | 345/179 |
| 2024/0007126 | A1 * | 1/2024 | Koike | G06F 3/038 |

FOREIGN PATENT DOCUMENTS

| | | |
|---|---|---|
| JP | 2017-529623 A | 10/2017 |
| JP | 2019-066960 A | 4/2019 |
| JP | 2021-114202 A | 8/2021 |
| JP | 2021-192213 A | 12/2021 |

* cited by examiner

F I G . 6
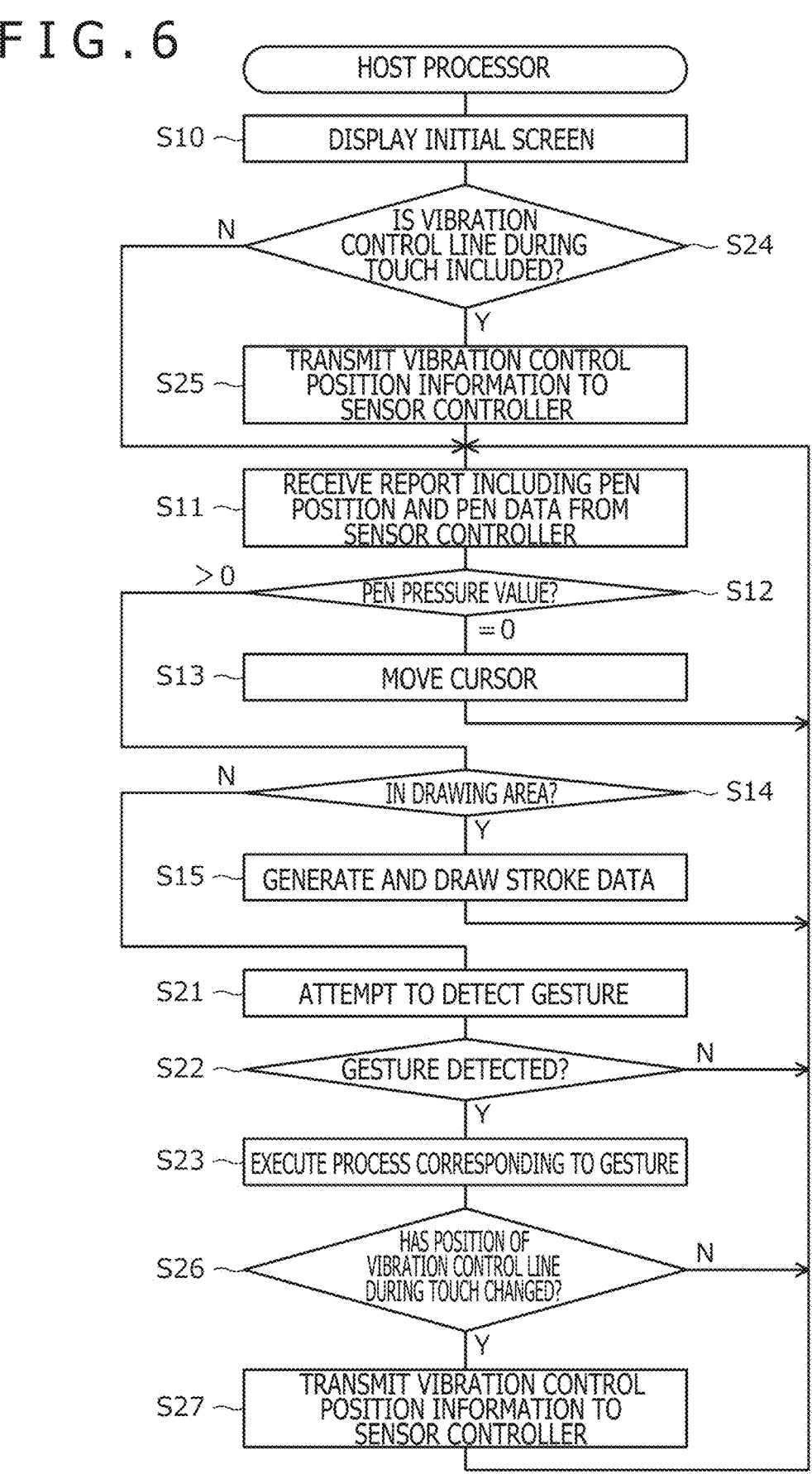

F I G . 7
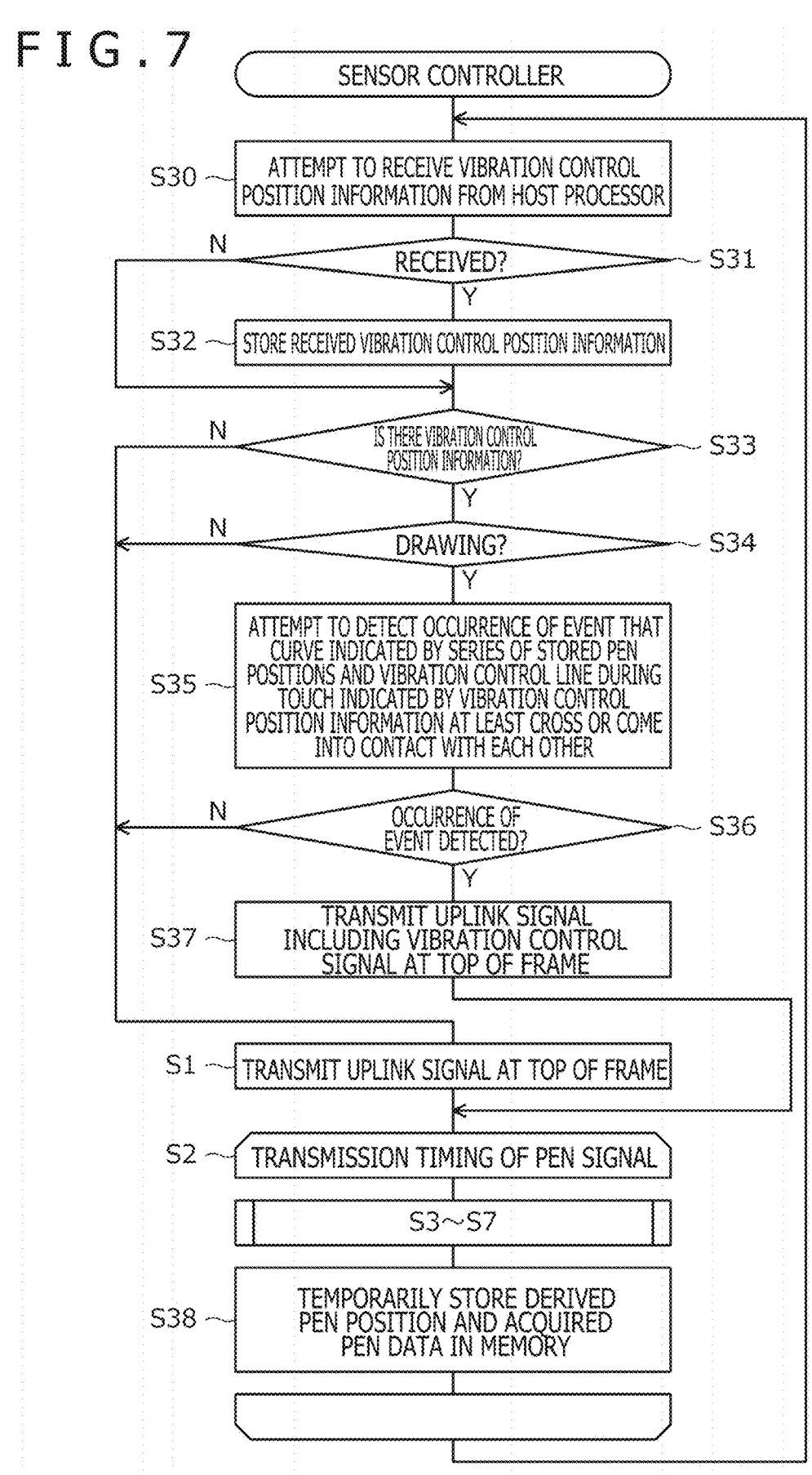

F I G . 1 4
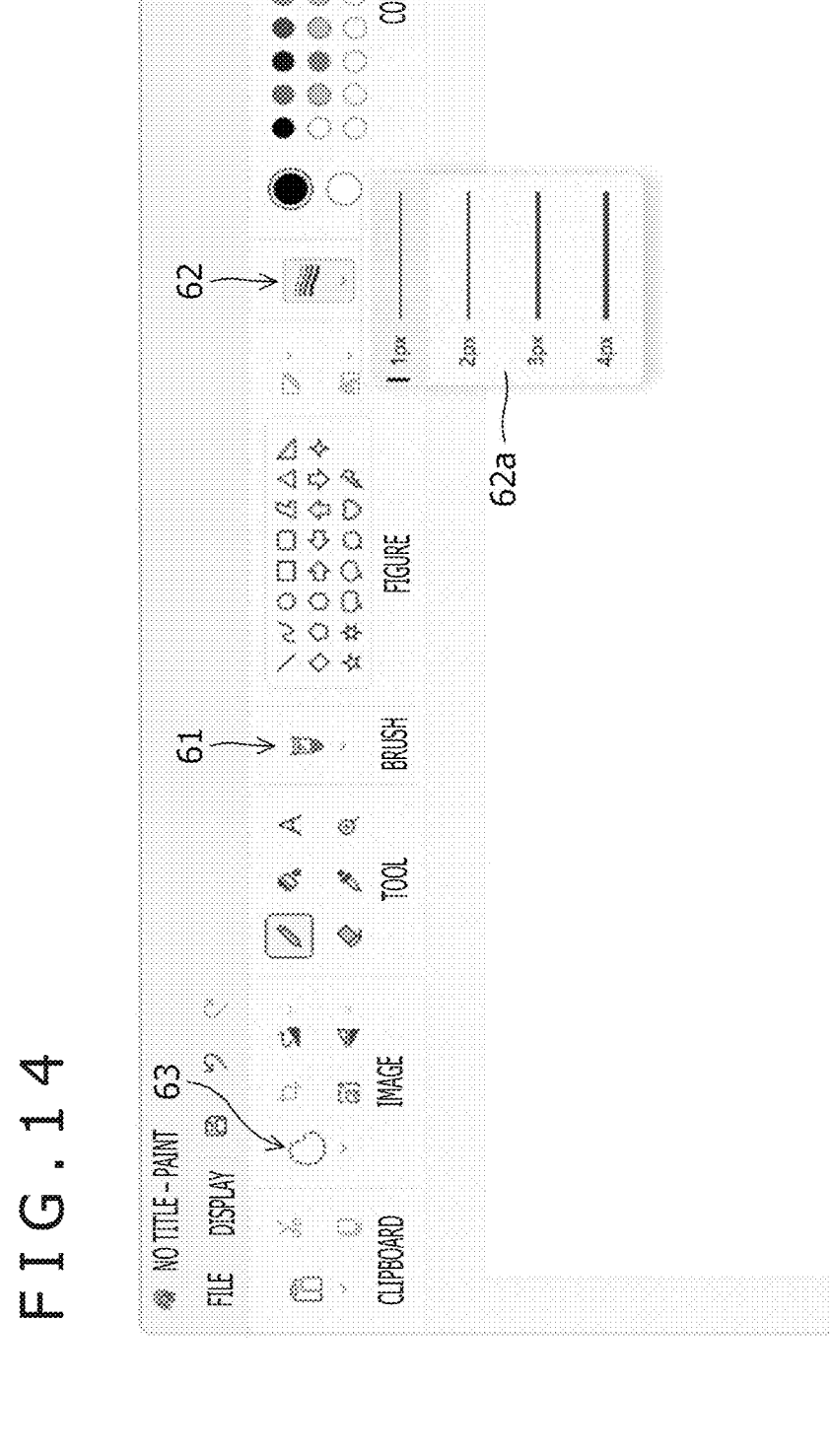

F I G . 1 5
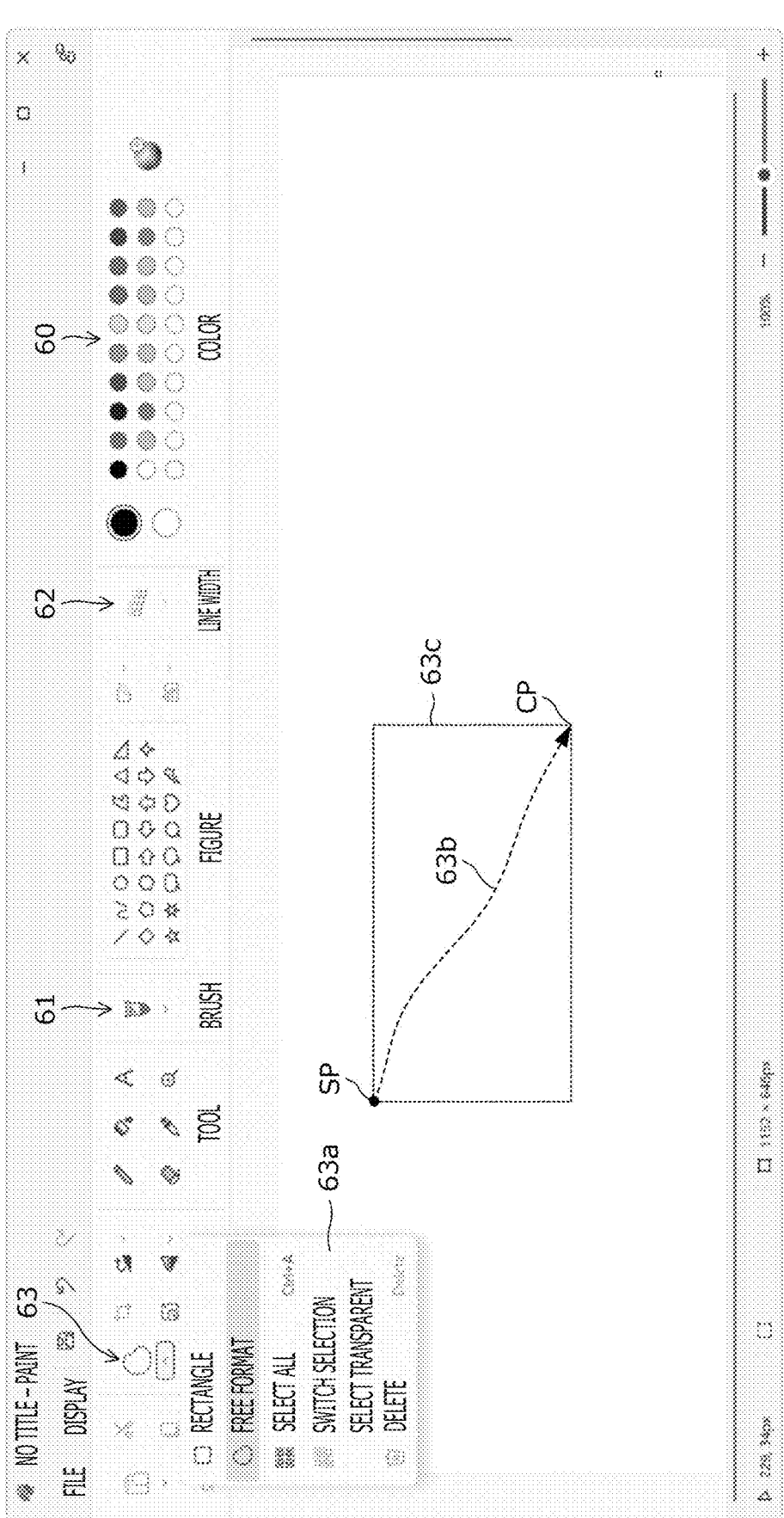

F I G . 1 6
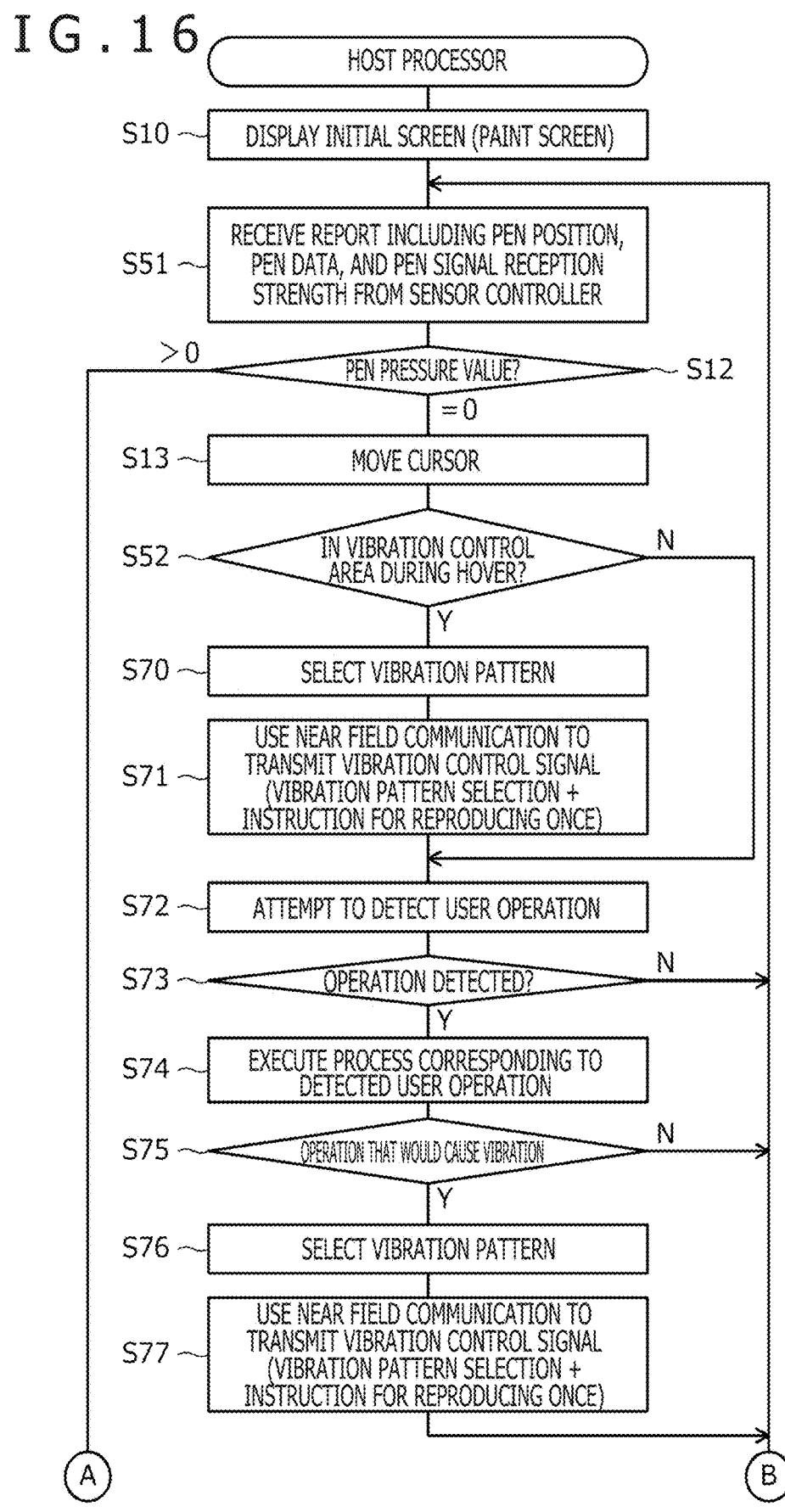

F I G . 1 7
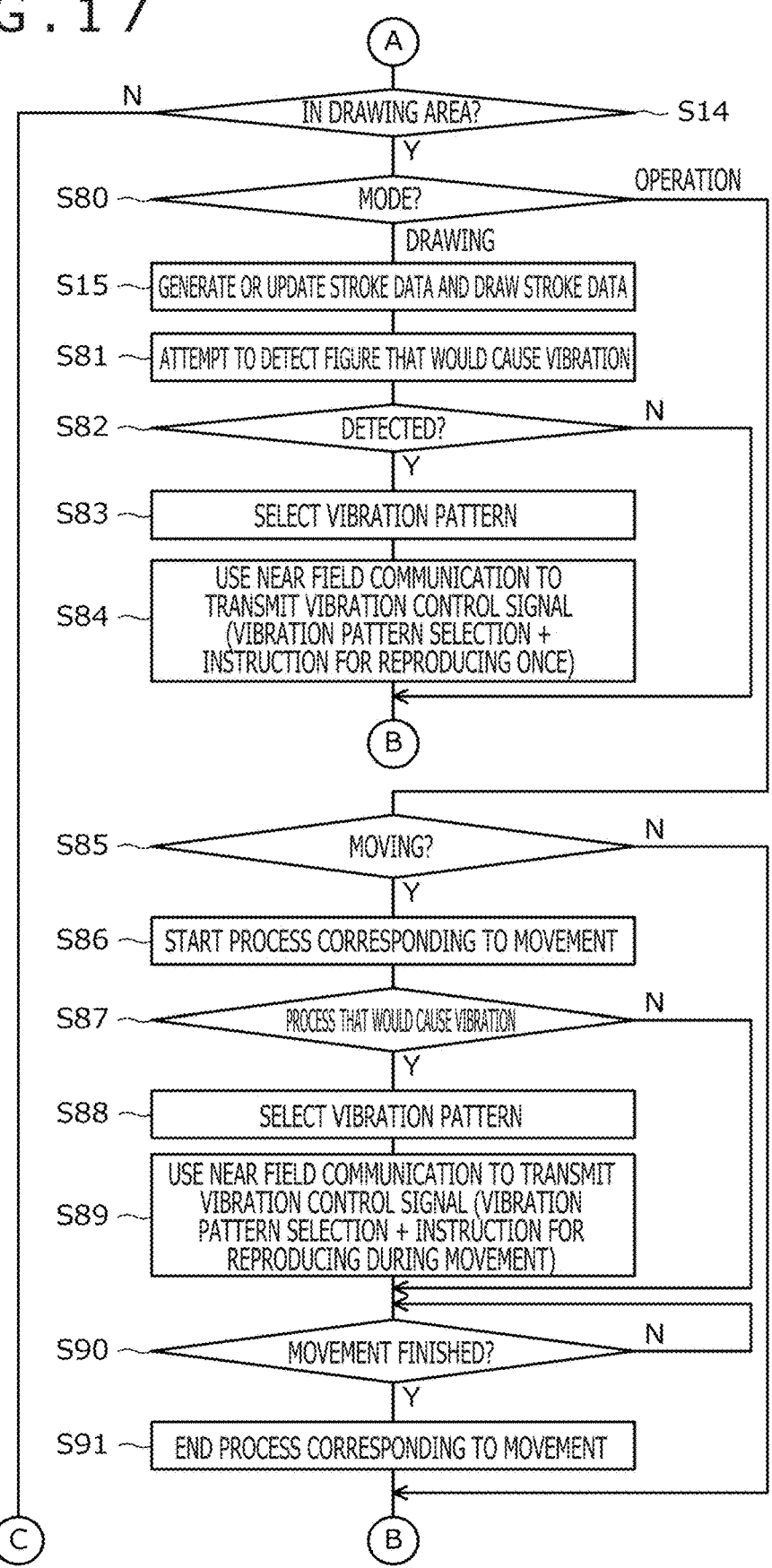

F I G . 1 8
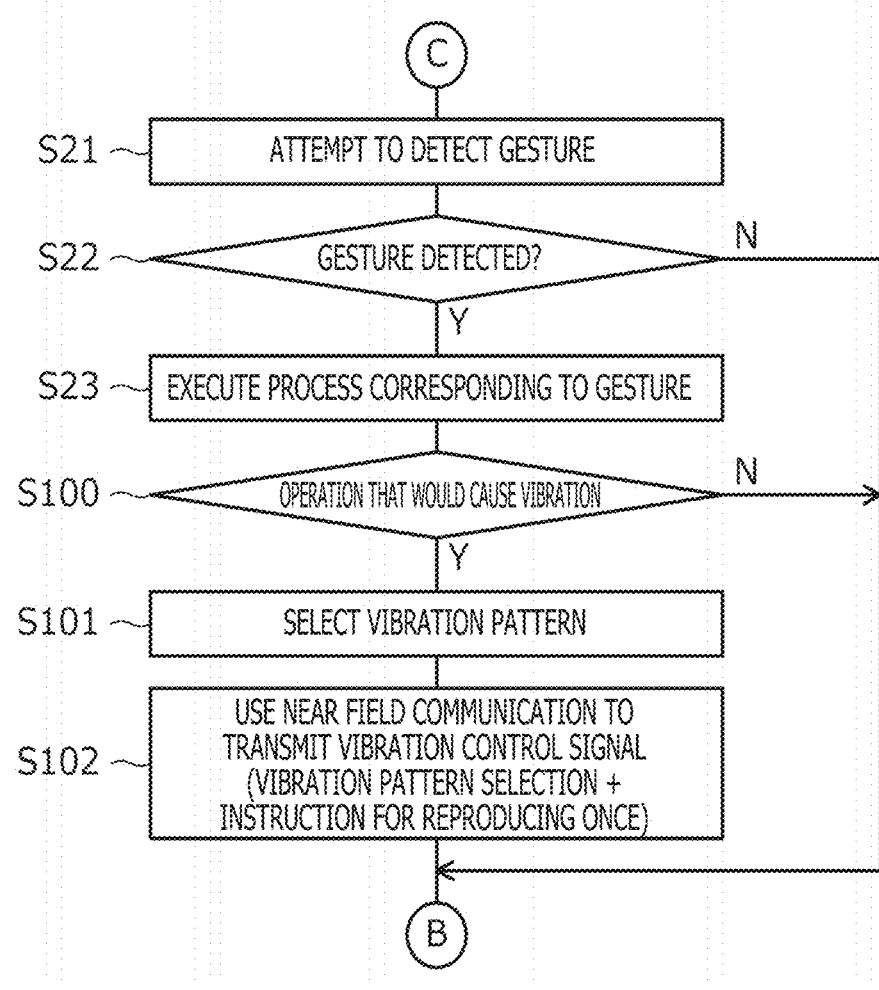

SYSTEM INCLUDING PEN AND PEN POSITION DETECTION APPARATUS, PEN POSITION DETECTION APPARATUS, AND METHOD OF ACTIVATING HAPTIC ELEMENT BUILT IN PEN

BACKGROUND

Technical Field

The present disclosure relates to a system including a pen and a pen position detection apparatus, a pen position detection apparatus, and a method of activating a haptic element built in a pen.

Description of the Related Art

A pen with a function of generating haptics-based tactile feedback is known. Examples of this type of system including a pen are disclosed in U.S. Patent Application Publication No. 2013/0307829, Japanese Patent Laid-Open No. 2002-259044, U.S. Pat. No. 10,120,446, Japanese Patent Laid-Open No. 2019-066960, and Japanese Patent Laid-Open No. 2009-238081. The system described in U.S. Patent Application Publication No. 2013/0307829 and Japanese Patent Laid-Open No. 2002-259044 is configured to cause the pen to vibrate when the pen is positioned on an item displayed on a screen. The system described in U.S. Pat. No. 10,120,446, Japanese Patent Laid-Open No. 2019-066960, and Japanese Patent Laid-Open No. 2009-238081 is configured to cause the front end of the pen to vibrate to thereby mimic the feel of writing on paper.

It would be convenient if the tactile feedback can be generated in a timely manner when the pen position crosses a boundary of a desired area, such as when the pen position extends outside of a signature field while the user fills in the signature field. However, to realize this by using, for example, the technique described in U.S. Patent Application Publication No. 2013/0307829 and Japanese Patent Laid-Open No. 2002-259044, an area on one side of the boundary is set to trigger a vibration. In this case, the tactile feedback is also generated when the pen is merely positioned in the area, rather than extending outside of the signature field during writing.

BRIEF SUMMARY

An aspect of the present disclosure is directed to providing a system including a pen and a pen position detection apparatus, a pen position detection apparatus, and a method of activating a haptic element built in a pen that can generate tactile feedback in a timely manner when the pen position crosses a boundary of a desired area.

When the pen is used on conventional paper, the friction between the pen tip and the paper fiber changes according to the change in the movement direction of the pen, and the user holding the pen can feel the change. However, there is no such change in friction when the pen is used on a panel surface, and consequently the user holding the pen cannot feel the change in friction. As a result, the user cannot experience a realistic feel of writing.

Therefore, another aspect of the present disclosure is directed to providing a system including a pen and a pen position detection apparatus, a pen position detection apparatus, and a method of activating a haptic element built in a pen that can reproduce a realistic feel of writing.

According to the first aspect of the present disclosure, a system is provided including a pen and a pen position detection apparatus, in which the pen includes a signal transmitter that transmits a pen signal, a signal receiver that receives a vibration control signal, and a haptic element that is activated in response to the vibration control signal. The pen position detection apparatus is configured to detect the pen signal to derive a pen position, detect occurrence of an event that a drawing line indicated by a series of derived pen positions crosses or comes into contact with a predetermined line segment, and transmit the vibration control signal to activate the haptic element in response to the detection of the occurrence of the event.

The first aspect of the present disclosure provides a pen position detection apparatus used along with a pen including a haptic element that is activated in response to a vibration control signal. The pen position detection apparatus is configured to detect a pen signal transmitted from the pen and derive a pen position, detect occurrence of an event that a drawing line indicated by a series of derived pen positions crosses or comes into contact with a predetermined line segment, and transmit the vibration control signal to activate the haptic element in response to the detection of the occurrence of the event.

The first aspect of the present disclosure provides a method of activating a haptic element built in a pen. The method includes a step of transmitting, by the pen, a pen signal, a step of detecting, by a pen position detection apparatus, the pen signal to derive a pen position, a step of detecting, by the pen position detection apparatus, occurrence of an event that a drawing line indicated by a series of derived pen positions crosses or comes into contact with a predetermined line segment, a step of transmitting, by the pen position detection apparatus, a vibration control signal in response to the detection of the occurrence of the event, a step of receiving, by the pen, the vibration control signal, and a step of activating, by the pen, the haptic element in response to the received vibration control signal.

According to the second aspect of the present disclosure, a system is provided including a pen and a pen position detection apparatus, in which the pen includes a signal transmitter that transmits a pen signal, a signal receiver that receives a vibration control signal, and a haptic element that is activated in response to the vibration control signal. The pen position detection apparatus is configured to detect the pen signal to derive a pen position, derive a writing direction of the pen based on a history of the pen position, and transmit the vibration control signal indicating a vibration pattern corresponding to the derived writing direction of the pen to activate the haptic element.

The second aspect of the present disclosure provides a pen position detection apparatus used along with a pen including a haptic element that is activated in response to a vibration control signal. The pen position detection apparatus is configured to detect a pen signal transmitted from the pen and derive a pen position, derive a writing direction of the pen based on a history of the pen position, and transmit the vibration control signal indicating a vibration pattern corresponding to the derived writing direction of the pen to activate the haptic element.

The second aspect of the present disclosure provides a method of activating a haptic element built in a pen. The method includes a step of transmitting, by the pen, a pen signal, a step of detecting, by a pen position detection apparatus, the pen signal to derive a pen position, a step of deriving, by the pen position detection apparatus, a writing direction of the pen based on a history of the pen position, a step of transmitting, by the pen position detection apparatus, a vibration control signal indicating a vibration pattern corresponding to the derived writing direction of the pen, a step of receiving, by the pen, the vibration control signal, and a step of activating, by the pen, the haptic element in response to the received vibration control signal.

According to the first aspect of the present disclosure, the tactile feedback can be generated in a timely manner when the pen position crosses the boundary of a desired area.

According to the second aspect of the present disclosure, a realistic feel of writing can be reproduced.

BRIEF DESCRIPTION OF THE SEVERAL VIEWS OF THE DRAWINGS

FIG. 5 depicts another example of a vibration control line during touch according to the first embodiment of the present disclosure;

FIG. 6 is a process flow chart illustrating a process executed by the host processor according to a second embodiment of the present disclosure;

FIG. 7 is a process flow chart illustrating a process executed by the sensor controller according to the second embodiment of the present disclosure;

FIG. 14 depicts a line width selection menu displayed when the user uses the pen to tap a line width selection menu launch icon;

FIG. 15 depicts an area selection menu displayed when the user uses the pen to tap an area selection menu launch icon;

FIG. 16 is a process flow chart illustrating a process executed by the host processor according to an instruction of the paint application;

FIG. 17 is a process flow chart illustrating the process executed by the host processor according to the instruction of the paint application; and FIG. 18 is a process flow chart illustrating the process executed by the host processor according to the instruction of the paint application.

DETAILED DESCRIPTION

Preferred embodiments of the present disclosure will be described in detail below with reference to the attached drawings.

Figure 1:
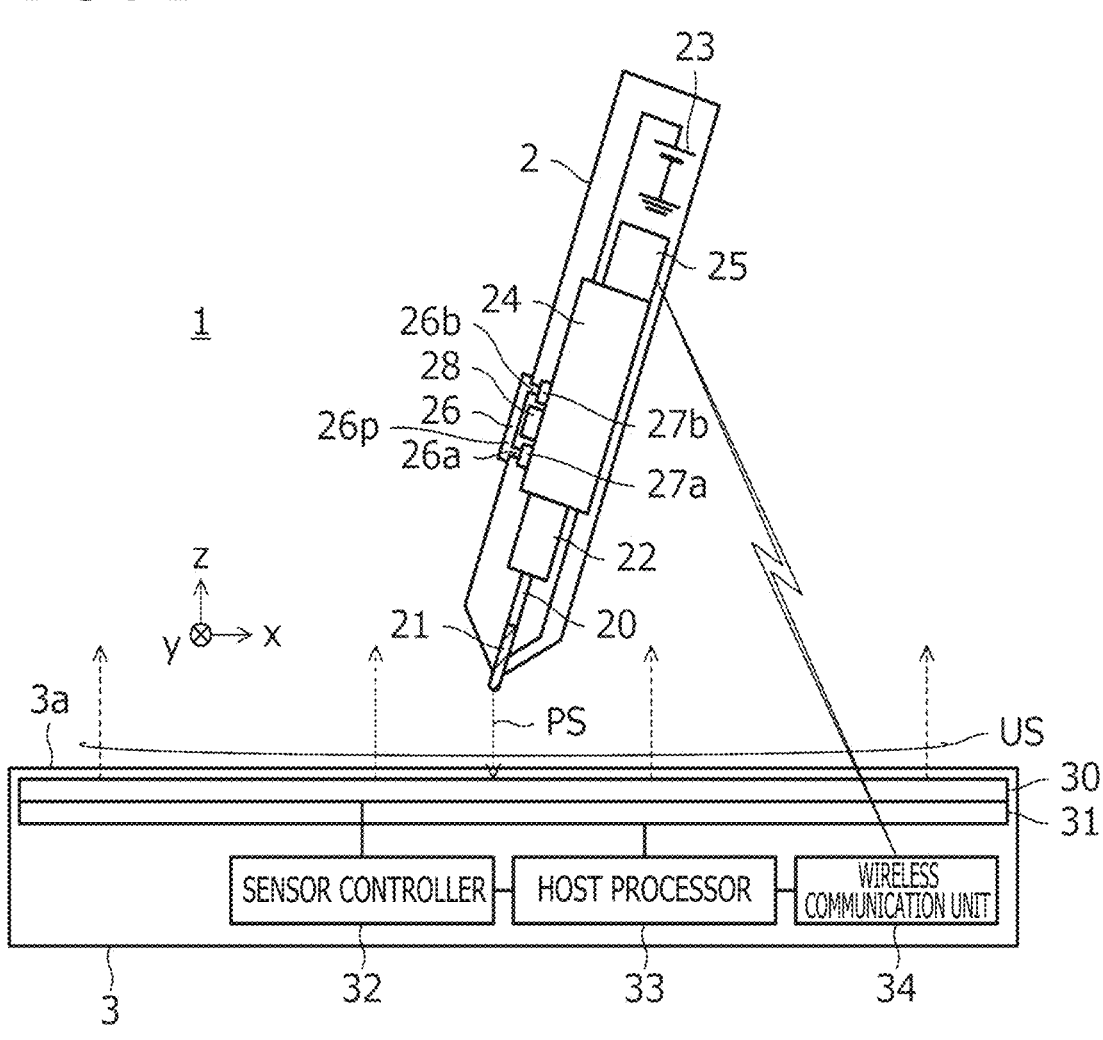
FIG. 1 depicts a configuration of a position detection system according to a first embodiment of the present disclosure.

FIG. 1 depicts a configuration of a position detection system 1 according to a first embodiment of the present disclosure. As illustrated in FIG. 1, the position detection system 1 includes a pen 2 and a pen position detection apparatus 3.

The pen position detection apparatus 3 is a computer with a function of detecting the pen 2. As illustrated in FIG. 1, the pen position detection apparatus 3 includes a panel surface 3a, a sensor 30 and a display 31 stacked together just below the panel surface 3a, a sensor controller 32, a host processor 33, and a wireless communication unit 34. In a typical example, the pen position detection apparatus 3 is a personal computer, such as a tablet terminal and a laptop.

The display 31 is a display apparatus, such as a liquid crystal display and an organic electroluminescence (EL) display, including a display surface. The panel surface 3a is the display surface of the display 31 in the pen position detection apparatus 3. The host processor 33 is a central processing unit of the pen position detection apparatus 3 with a function of controlling the components of the pen position detection apparatus 3 including the display 31. The host processor 33 can execute programs stored in a built-in memory, to execute various applications including an operating system of the pen position detection apparatus 3 and a drawing application. The display 31 plays a role of displaying various screens (images or videos) on the display surface based on video signals generated by the operating system or the application.

The wireless communication unit 34 is an apparatus that uses near field communication, such as Bluetooth (registered trademark), to communicate with other apparatuses including the pen 2. The host processor 33 can use the near field communication to communicate with the pen 2 through the wireless communication unit 34.

The sensor 30 is an apparatus used for the sensor controller 32 to communicate with the pen 2. The sensor 30 includes a plurality of X electrodes extending in a y direction in the panel surface 3a and arranged side by side at equal intervals in an x direction, and a plurality of Y electrodes extending in the x direction in the panel surface 3 and arranged side by side at equal intervals in the y direction. The plurality of X electrodes and the plurality of Y electrodes are independently connected to the sensor controller 32. The plurality of X electrodes or the plurality of Y electrodes may also be used as common electrodes in the display 31, and the pen position detection apparatus 3 in that case is called an "in-cell type." Alternatively, the plurality of X electrodes and the plurality of Y electrodes need not be used as common electrodes in the display 31, and the pen position detection apparatus 3 in that case is called an "on-cell type" or an "out-cell type."

The sensor controller 32 is an integrated circuit with a function of communicating with the pen 2 through the sensor 30 to derive the position of the pen 2 in the panel surface 3a and acquire data from the pen 2, and a function of successively supplying reports including the derived position and the acquired data to the host processor 33. The sensor controller 32 can execute programs installed as hardware or programs stored in the built-in memory, to realize these functions and execute various processes described later.

It is suitable that the sensor controller 32 and the pen 2 use, for example, an active capacitance system to communicate through the sensor 30. Although the following description is based on the assumption that the active capacitance system is used, it is obvious that an electromagnetic resonance system or other systems may be used. A signal transmitted by the sensor controller 32 to the pen 2 through the sensor 30 will be referred to as an "uplink signal US," and a signal transmitted by the pen 2 to the sensor controller 32 through the sensor 30 will be referred to as a "pen signal PS."

The sensor controller 32 is configured to communicate with the pen 2 in units of frames having a predetermined time length, and the sensor controller 32 uses a plurality of X electrodes or a plurality of Y electrodes to transmit the uplink signal US at the top of each frame. The uplink signal US transmitted in this way plays a role of notifying the pen 2 of the temporal position of the frame and the timing (time slot) that the pen 2 should use to transmit the pen signal PS in the frame. The uplink signal US also includes a command indicating a command instruction from the sensor controller 32 to the pen 2.

The pen signal PS may include a position signal for the sensor controller 32 to detect the position of the pen 2 and a data signal modulated by data transmitted from the pen 2 to the sensor controller 32. In the sensor controller 32, each of the plurality of X electrodes and the plurality of Y electrodes included in the sensor 30 is configured to receive the position signal. The sensor controller 32 is configured to use a normal distribution curve to approximate the distribution of the reception strength of the position signal in each of the x direction and the y direction and derive the peak position of each distribution to thereby derive the position of the pen 2 (hereinafter, referred to as the "pen position") in the panel surface 3a. One X electrode or Y electrode closest to the most recently derived pen position receives the data signal, and the sensor controller 32 demodulates the data signal to acquire the data transmitted by the pen 2 (hereinafter, referred to as the "pen data"). The pen data may include a response to the command included in the uplink signal US, as well as a pen pressure value indicating the pressure applied to the pen tip of the pen 2 and switch information indicating the on-off state of press button switches 27a and 27b (described later) provided on the pen 2.

Figure 2:
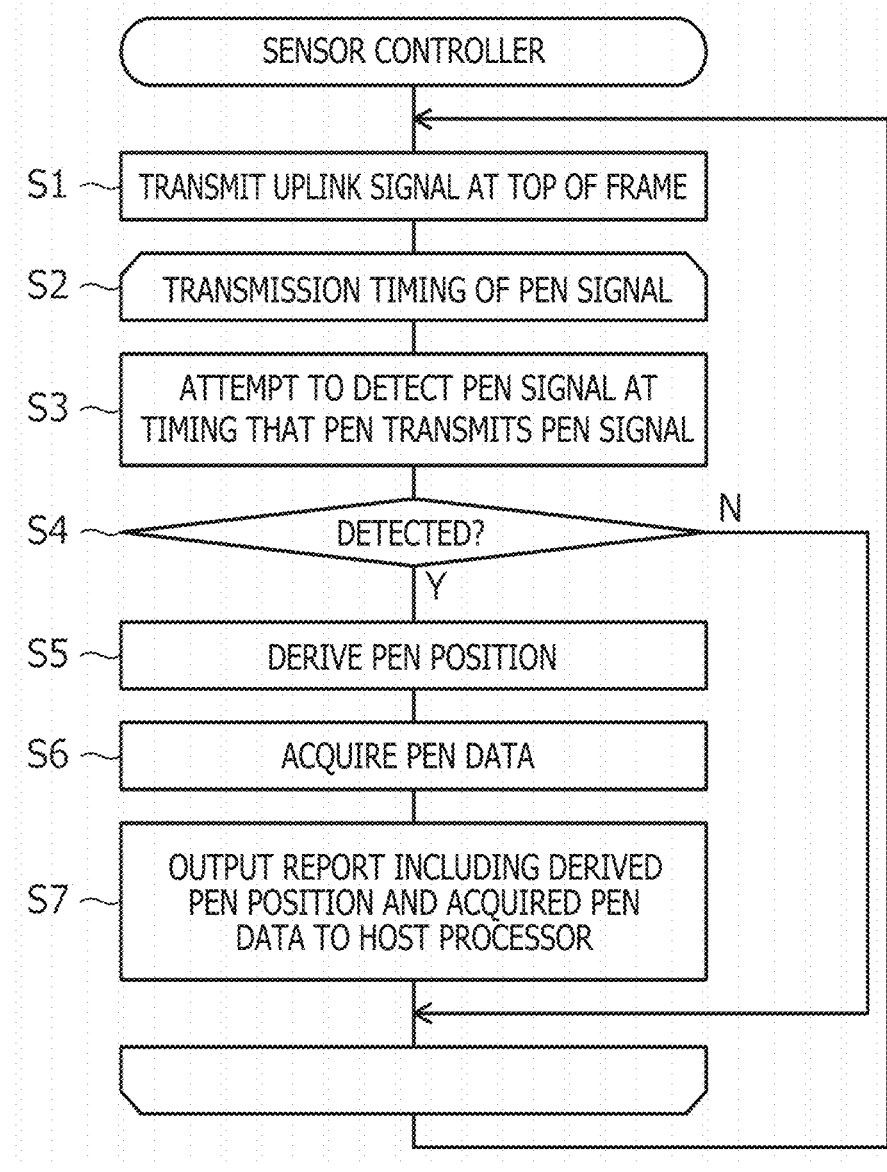
FIG. 2 is a process flow chart illustrating a process executed by a sensor controller according to the first embodiment of the present disclosure.

FIG. 2 is a process flow chart illustrating a process executed by the sensor controller 32. The process executed by the sensor controller 32 will be described again in detail with reference to FIG. 2. The sensor controller 32 first transmits the uplink signal US at the top of the frame (step S1). The sensor controller 32 then executes the process of steps S3 to S7 at every timing (the timing notified by the uplink signal US) at which the pen 2 is to transmit the pen signal PS in the corresponding frame (step S2).

Specifically, the sensor controller 32 first uses the sensor 30 to attempt to detect the pen signal PS (step S3). The sensor controller 32 then determines whether the pen signal PS is detected as a result of the attempt (step S4). If the sensor controller 32 determines "not detected," the sensor controller 32 moves the process to the next timing. On the other hand, if the sensor controller 32 determines "detected" in step S4, the sensor controller 32 derives the pen position (step S5) and acquires the pen data (step S6) based on the detected pen signal PS. The sensor controller 32 outputs a report including the derived pen position and the acquired pen data to the host processor 33 (step S7) and returns to step S3.

FIG. 1 will be further described. A series of reports supplied by the sensor controller 32 to the host processor 33 are used for the process executed by the drawing application in the host processor 33. The process of the drawing application here includes generating and displaying digital ink, moving a cursor, detecting various gestures, such as tapping and dragging, and controlling a haptic element 28 (described later) built in the pen 2.

The generation and display of digital ink among these is briefly described. The drawing application is configured to generate one piece of stroke data based on a series of pen positions and pen data continuously acquired when the pen pressure value is larger than 0. The drawing application is configured to use the series of generated stoke data to generate the digital ink. Every time the pen position is to be newly derived, the drawing application also uses one or more past pen positions included in the same stroke data to generate and render a spline curve such as a Catmull-Rom curve. The drawing application in this case also executes a process of controlling the appearance of the generated spline curve based on the pen data. The process includes a process of controlling the line width or the transparency based on the pen pressure value. The drawing application generates a video signal based on the spline curve rendered in this way and supplies the video signal to the display 31. In this way, the spline curve rendered by the drawing application is displayed on the display 31.

As illustrated in FIG. 1, the pen 2 includes an axial rod 20, a pen tip electrode 21, a pressure sensor 22, a battery 23, an integrated circuit 24, a wireless communication circuit 25, a seesaw switch 26, the press button switches 27a and 27b, and the haptic element 28.

The axial rod 20 is a columnar member of a pen shaft of the pen 2. The front end of the axial rod 20 is the pen tip of the pen 2, and the back end of the axial rod 20 is abutted to the pressure sensor 22. The pen tip electrode 21 is a conductor arranged on the pen tip of the pen 2, and the pen tip electrode 21 is electrically connected to the integrated circuit 24.

The pressure sensor 22 is a sensor that detects the pressure applied to the front end of the axial rod 20. The pressure detected by the pressure sensor 22 is supplied to the integrated circuit 24, and the integrated circuit 24 sets the pressure as the pen pressure value in the pen signal PS. The battery 23 plays a role of supplying power necessary to activate the integrated circuit 24, the wireless communication circuit 25, and the haptic element 28.

The integrated circuit 24 is an integrated circuit provided with various circuits including a booster circuit, a transmission circuit, a reception circuit, and a processing circuit. The reception circuit is connected to the pen tip electrode 21, and the reception circuit plays a role of a signal receiver that uses the pen tip electrode 21 to detect the uplink signal US and receive the uplink signal US. The transmission circuit is also connected to the pen tip electrode 21, and the transmission circuit plays a role of a signal transmitter that uses the booster circuit at a timing indicated by the uplink signal US, to cause a change in the pen tip electrode 21 and transmit the pen signal PS. The processing circuit is a circuit functioning as a controller that controls the components of the pen 2. The processing circuit executes a process of generating the pen signal PS based on the uplink signal US received by the reception circuit, and causing the transmission circuit to transmit the generated pen signal PS.

The wireless communication circuit 25 is an apparatus that uses near field communication, such as Bluetooth (registered trademark), to communicate with other apparatuses including the pen position detection apparatus 3. The near field communication is two-way communication. Hence, the wireless communication circuit 25 functions as a signal transmitter that transmits a signal and also functions as a signal receiver that receives a signal. The integrated circuit 24 can use the near field communication to communicate with the pen position detection apparatus 3 through the wireless communication circuit 25.

The host processor 33 is configured to transmit a vibration control signal to the pen 2 through the near field communication. The vibration control signal is a signal for instructing activation of the haptic element 28. Specifically, the vibration control signal may be a signal for simply instructing the haptic element 28 to act (operate), or may be a signal for instructing the haptic element 28 to act at a predetermined timing. When the integrated circuit 24 receives the vibration control signal through the wireless communication circuit 25, the integrated circuit 24 controls an action of the haptic element 28 in response to the received vibration control signal.

The seesaw switch 26 is a switch pressing member including a plate-shaped portion 26p arranged along the surface of the housing, and two legs 26a and 26b protruding from the plate-shaped portion 26p toward the inside of the housing. The legs 26a and 26b are provided near one end and near another end, respectively, in the pen shaft direction of the plate-shaped portion 26p, and the front ends of the legs 26a and 26b are abutted to the press button switches 27a and 27b. When the user presses the surface near the one end in the pen shaft direction of the seesaw switch 26, the leg 26a moves toward the inside and presses the press button switch 27a. On the other hand, when the user presses the surface near the other end in the pen shaft direction of the seesaw switch 26, the leg 26b moves toward the inside and presses the press button switch 27b. When one of the press button switches 27a and 27b is turned on, the other is turned off. When one of the press button switches 27a and 27b is turned off, the other is turned on. The on-off state of the press button switches 27a and 27b is supplied to the integrated circuit 24, and the integrated circuit 24 sets the on-off state as the switch information in the pen signal PS.

The haptic element 28 is an element that is activated according to the control of the integrated circuit 24, and the haptic element 28 is arranged in an area between the two legs 26a and 26b of the seesaw switch 26. In a typical example, the haptic element 28 is a vibrator or an actuator. A suitable haptic element 28 can be a piezoelectric vibrator, which is formed by building a weight and a piezoelectric ceramic material in a casing, and expanding and contracting the piezoelectric ceramic material under the control from the integrated circuit 24 to thereby move the weight to cause vibration. Note that the haptic element 28 is arranged in the area between the legs 26a and 26b in order to particularly vibrate the part in contact with (or near) the fingers of the person holding the pen 2 on the surface of the pen 2. However, the haptic element 28 may also be arranged at a position other than between the legs 26a and 26b.

Figure 3:
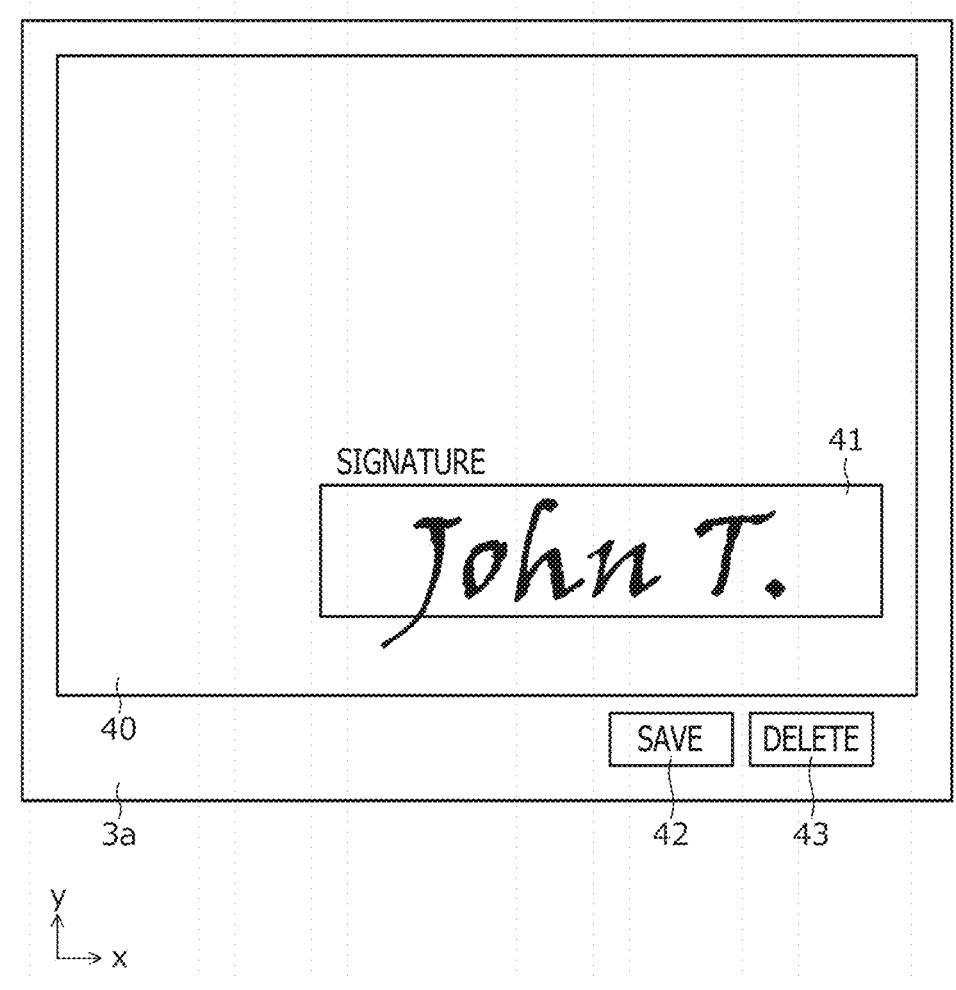
FIG. 3 depicts an example of a screen displayed on a panel surface by a drawing application according to the first embodiment of the present disclosure.
Figure 4:
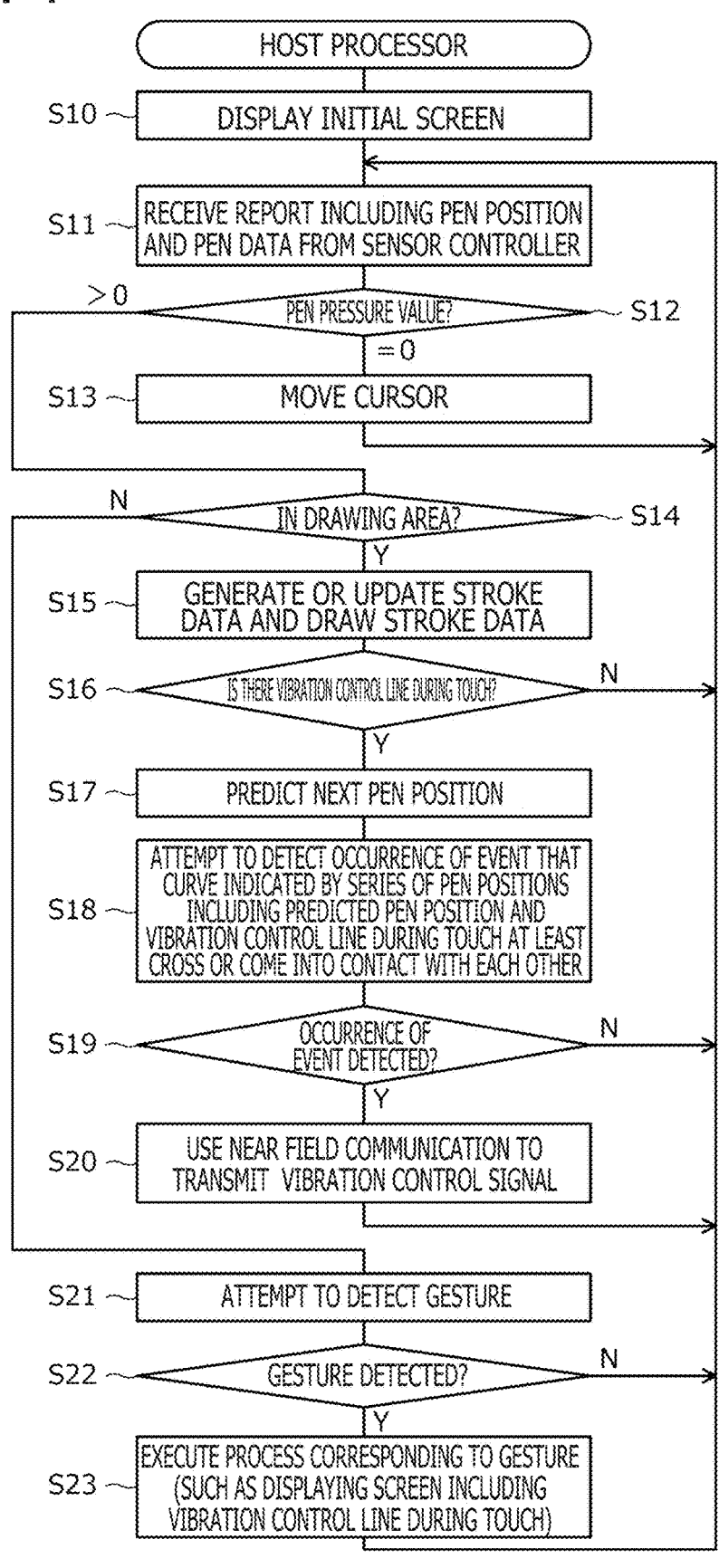
FIG. 4 is a process flow chart illustrating a process executed by a host processor according to the first embodiment of the present disclosure.

FIG. 3 depicts an example of a screen displayed on the panel surface 3a by the drawing application (host processor 33) according to the present embodiment. FIG. 4 is a process flow chart illustrating a process executed by the host processor 33 according to the present embodiment. A process for generating tactile feedback in a timely manner when the pen position crosses the boundary of a desired area will be described in detail with reference to FIGS. 3 and 4.

In FIG. 3, the drawing application according to the example displays a screen including, on the panel surface 3a, a drawing area 40 including a signature field 41, and a save button 42 and a delete button 43 arranged outside the drawing area 40. When the user uses the pen 2 to start filling in the drawing area 40, the sensor controller 32 successively supplies the pen positions and the pen data to the host processor 33. The drawing application executes a process of using the series of pen positions and pen data supplied in this way, to generate stroke data in real time, rendering the generated stroke data while storing the stroke data in the memory, and displaying the stroke data on the panel surface 3a. FIG. 3 illustrates a state in which the user uses the pen 2 to enter a character string "John T.," and as a result, the drawing application displays the character string "John T." on the panel surface 3a.

The save button 42 is a button for causing the drawing application to execute a process of saving the series of generated stroke data as digital ink. When the user uses the pen 2 to tap the save button 42, the drawing application detects the tap and executes a process of saving, to the memory in the pen position detection apparatus 3, the series of stroke data stored in the temporary memory by that time as digital ink indicating the signature of the user. The delete button 43 is a button for causing the drawing application to delete the entered character string. When the user uses the pen 2 to tap the delete button 43, the drawing application detects the tap and executes a process of deleting the series of stroke data corresponding to the entered character string from the memory, generating a video signal for deleting the series of displayed stroke data, and supplying the video signal to the display 31. Although FIG. 3 illustrates only the save button 42 and the delete button 43, it is obvious that various other user interfaces may be provided in the screen. Various user interfaces may include an interface for changing the screen displayed on the panel surface 3a to another screen through a user operation.

In the example of FIG. 3, part of the second stroke of "J" of "John T." extends outside of the signature field 41. The drawing application of the present embodiment has a function of detecting the occurrence of extending outside, and activating the haptic element 28 of the pen 2 in real time to notify the user of the extending outside. As a result, the user notices that the signature has extended outside of the signature field 41, and the user can press the delete button 43 to rewrite the signature. Hereinafter, the control line that triggers a notification will be referred to as a "vibration control line during touch." The contour line (outline) of the signature field 41 is the vibration control line during touch in the example of FIG. 3. Although the vibration control line during touch is closed in the example of FIG. 3, the vibration control line during touch may be an open line. A specific process for realizing the tactile feedback in a timely manner when the pen position crosses the vibration control line during touch will be described with reference to FIG. 4.

FIG. 4 illustrates a process executed by the host processor 33 according to an instruction of the drawing application. As illustrated in FIG. 4, the host processor 33 first displays an initial screen on the panel surface 3a (step S10). The initial screen may but need not include the vibration control line during touch. The host processor 33 then receives a report including the pen position and the pen data from the sensor controller 32 (step S11) and determines whether the pen pressure value included in the received pen data is larger than 0 (that is, whether the pen 2 is slid on the panel surface 3a) or is 0 (that is, whether the pen 2 hovers in the air above the panel surface 3a) (step S12). The host processor 33 that has determined that the pen pressure value is 0 in the determination moves the cursor displayed on the panel surface 3a according to the pen position (step S13) and returns the process to step S11.

On the other hand, the host processor 33 that has determined that the pen pressure value is larger than 0 in the determination of step S12 determines whether the current pen position is in the drawing area (step S14). If the host processor 33 determines "not in the drawing area" in the determination, the host processor 33 attempts to detect a gesture made by the pen 2 (step S21). The host processor 33 determines whether a gesture (such as tap of a button displayed on the screen) is detected as a result of the attempt (step S22). If the host processor 33 determines "not detected," the host processor 33 returns the process to step S11. On the other hand, if the host processor 33 determines "detected," the host processor 33 executes a process corresponding to the gesture (step S23) and returns the process to step S11. The process executed in step S23 includes a process of displaying the screen including the vibration control line during touch on the panel surface 3a.

On the other hand, the host processor 33 that has determined "in the drawing area" in the determination of step S14 generates or updates stroke data based on the pen position and the pen data and renders the stroke data obtained as a result of the generation or the update to draw the stroke data on the panel surface 3a (step S15).

The host processor 33 then determines whether there is a vibration control line during touch on the displayed screen (step S16). The host processor 33 that has determined "no" in the determination returns the process to step S11. On the other hand, the host processor 33 that has determined "yes" in the determination predicts the pen position that would be included in the report to be received next from the sensor controller 32 (step S17). Specifically, the host processor 33 may calculate the movement speed of the pen position from two or more latest pen positions and derive the next pen position by assuming that the movement speed will continue, thereby predicting the next pen position. The host processor 33 may use a character recognition technique to determine the character currently entered by the user and predict the next pen position according to the shape of the determined character. The host processor 33 may let artificial intelligence learn the stroke data of characters and figures entered by the user in the past, input the currently generated stroke data to the artificial intelligence to determine the character or the figure entered by the user, and predict the next pen position according to the shape of the determined character or figure.

Among the prediction methods, the prediction of the next pen position according to the movement speed may be performed by using simple calculation of two coordinates to calculate the next pen position as indicated in the following Equations (1) and (2). More specifically, a movement speed vector can be obtained by Equation (1), and the obtained movement speed vector can be used to calculate the next pen position in Equation (2). In Equations (1) and (2), the next pen position is (xp, yp), the last (newest) pen position is (x1, y1), and the second last (newest) pen position is (x2, y2). This can reduce the processing load of the host processor 33 in the prediction.

[Expression 1]

$$\begin{pmatrix} v_x \\ v_y \end{pmatrix} = \begin{pmatrix} x_1 \\ y_1 \end{pmatrix} - \begin{pmatrix} x_2 \\ y_2 \end{pmatrix} \tag{1}$$

$$\begin{pmatrix} x_p \\ x_p \end{pmatrix} = \begin{pmatrix} x_1 \\ y_1 \end{pmatrix} + \begin{pmatrix} v_x \\ v_y \end{pmatrix} \tag{2}$$

In addition to the movement speed, the acceleration may also be used to predict the next pen position. In this case, simple calculation of three coordinates can be used to calculate the next pen position and thereby predict the next pen position as indicated in Equations (3) to (6). More specifically, two movement speed vectors can be obtained by Equations (3) and (4), and the obtained two movement speed vectors can be used to obtain an acceleration vector by Equation (5). The obtained movement speed vectors and acceleration vector can be used to calculate the next pen position in Equation (6). In Equations (3) to (6), the next pen position is (xp, yp), the last (newest) pen position is (x1, y1), the second last (newest) pen position is (x2, y2), and the third last (newest) pen position is (x3, y3).

[Expression 2]

$$\begin{pmatrix} v_{x1} \\ v_{y1} \end{pmatrix} = \begin{pmatrix} x_1 \\ y_1 \end{pmatrix} - \begin{pmatrix} x_2 \\ y_2 \end{pmatrix} \tag{3}$$

$$\begin{pmatrix} v_{x2} \\ v_{y2} \end{pmatrix} = \begin{pmatrix} x_2 \\ y_2 \end{pmatrix} - \begin{pmatrix} x_3 \\ y_3 \end{pmatrix} \tag{4}$$

$$\begin{pmatrix} a_x \\ a_y \end{pmatrix} = \begin{pmatrix} v_{x1} \\ v_{y1} \end{pmatrix} - \begin{pmatrix} v_{x2} \\ v_{y2} \end{pmatrix} \tag{5}$$

$$\begin{pmatrix} x_p \\ x_p \end{pmatrix} = \begin{pmatrix} x_1 \\ y_1 \end{pmatrix} + \begin{pmatrix} v_{x1} \\ v_{y1} \end{pmatrix} + \begin{pmatrix} a_x \\ a_y \end{pmatrix} \tag{6}$$

After the completion of the prediction of the pen position, the host processor 33 attempts to detect occurrence of an event that a drawing line indicated by the series of pen positions including the predicted pen position crosses or comes into contact with the vibration control line during touch (step S18). Specifically, the host processor 33 can temporarily add the predicted pen position to the currently generated stroke data and generate a spline curve based on the stroke data available after the addition. The host processor 33 can use the generated spline curve as the drawing line to attempt the detection. The host processor 33 may generate a line segment connecting one of the one or more pen positions included in the stroke data generated in step S15 and the predicted pen position and use the generated line segment as the drawing line to attempt the detection.

The host processor 33 determines whether the occurrence of the event is detected in step S18 (step S19). If the host processor 33 determines "not detected," the host processor 33 returns to step S11 and repeats the process. On the other hand, the host processor 33 that has determined "detected" uses the near field communication to transmit a predetermined vibration control signal to the pen 2 through the wireless communication unit 34 illustrated in FIG. 1 (step S20). The vibration control signal transmitted in this way may be a signal for simply instructing the haptic element 28 to act (operate) or may be a signal for instructing the haptic element 28 to act after a predetermined period of time. For example, when the host processor 33 can predict the timing of the occurrence of crossing or contacting based on the movement speed of the pen 2, the vibration control signal may be a signal including information for activating the haptic element 28 at the predicted timing.

The integrated circuit 24 of the pen 2 that has received the vibration control signal activates the haptic element 28 at the timing indicated by the vibration control signal. As a result, the user receives a notification through the vibration, and the user can recognize that the entered line will cross or come into contact with the vibration control line during touch (or that the entered line has crossed or has come into contact with the vibration control line during touch).

As described above, according to the position detection system 1 of the present embodiment, the host processor 33 detects the occurrence of the event that the vibration control line during touch set in the screen and the drawing line indicated by the input stroke data at least cross or come into contact with each other, and transmits the vibration control signal through the near field communication in response to the detection of the occurrence of the event to thereby activate the haptic element 28 of the pen 2. Thus, the tactile feedback can be generated in a timely manner when the pen position crosses the boundary of the desired area. As a result, the user can recognize in a timely manner that the entered line crosses or comes into contact with the vibration control line during touch.

Here, the reason that the host processor 33 executes the process of predicting the next pen position in step S17 of FIG. 4 is that there is a certain delay in the control of the haptic element 28 due to the near field communication. When the delay can be ignored, the host processor 33 need not execute the process of step S17 and may attempt to detect the occurrence of the event that the drawing line indicated by the acquired series of pen positions crosses or comes into contact with the vibration control line during touch, in step S18.

Although the contour line of the signature field 41 is the vibration control line during touch in the example illustrated in the present embodiment, it is obvious that another line may be used as the vibration control line during touch.

Figure 5:
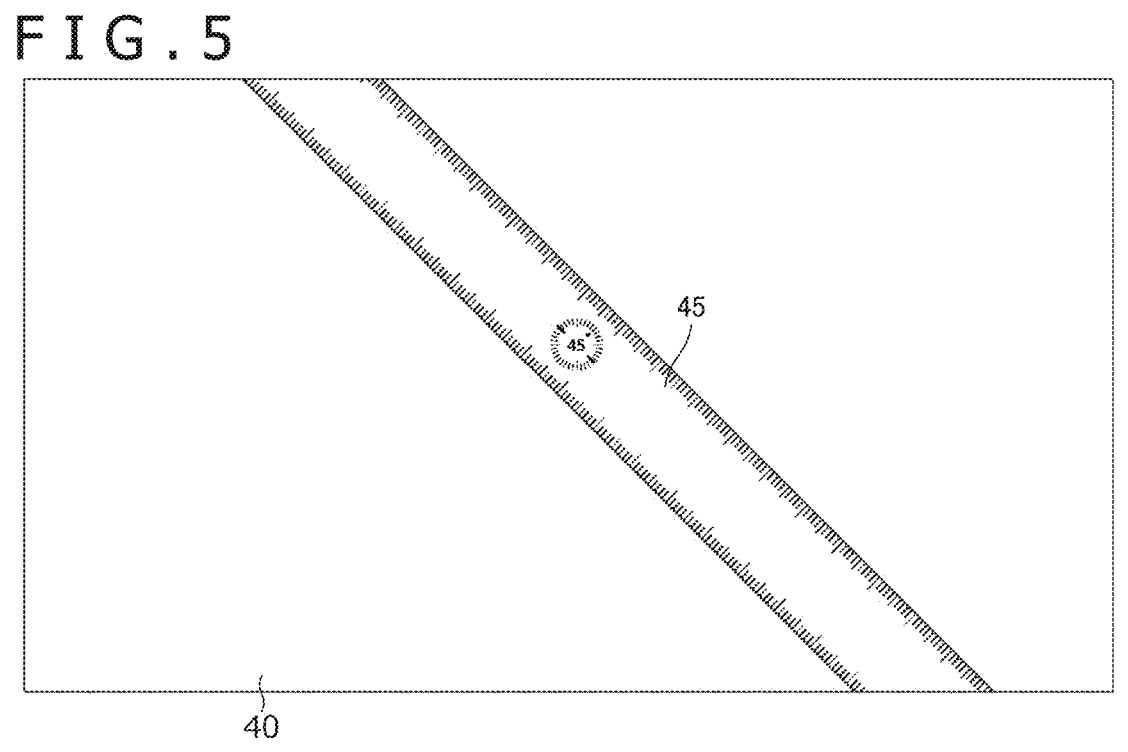

FIG. 5 depicts another example of the vibration control line during touch according to the present embodiment. FIG. 5 illustrates an example of displaying an electronic ruler 45 in the drawing area 40. The electronic ruler 45 is a virtual ruler displayed in the drawing area 40 by the drawing application, and the electronic ruler 45 can be displayed at any position, angle, and size according to the user operation. The contour line of the electronic ruler 45 can be used as the vibration control line during touch, and the position detection system 1 of the present embodiment can generate the tactile feedback in a timely manner when the pen position crosses the contour line of the electronic ruler 45. Thus, although there are no bumps or dips in reality, the feeling of rising up can be reproduced when the pen 2 runs over the ruler and the feeling of dropping can be reproduced when the pen 2 leaves the area above the ruler. According to the position detection system 1 of the present embodiment, the haptic element 28 is not controlled when the pen 2 is hovering. This can prevent the generation of the feeling of rising up or dropping when the pen 2 merely moves in the air above the contour line of the electronic ruler 45.

Next, the position detection system 1 according to a second embodiment of the present disclosure will be described. The position detection system 1 according to the present embodiment is different from the position detection system 1 according to the first embodiment in that the sensor controller 32, instead of the host processor 33, transmits the vibration control signal for activating the haptic element 28. The position detection system 1 according to the present embodiment is similar to the position detection system 1 according to the first embodiment in other respects including the configuration of the position detection system 1 illustrated in FIG. 1, and mainly the difference from the position detection system 1 according to the first embodiment will be described.

FIG. 6 is a process flow chart illustrating a process executed by the host processor 33 according to the present embodiment. The process illustrated in FIG. 6 is also a process executed by the host processor 33 according to an instruction of the drawing application as in FIG. 4. FIG. 7 is a process flow chart illustrating a process executed by the sensor controller 32 according to the present embodiment.

As can be understood by comparing FIGS. 6 and 4, the process executed by the host processor 33 according to the present embodiment is different from the process executed by the host processor 33 according to the first embodiment in that steps S24 and S25 are executed after step S10, steps S26 and S27 are executed after step S23, and steps S16 to S20 are not executed.

Step S24 is a step of determining whether the vibration control line during touch is included in the initial screen. If the host processor 33 determines "included" here, the host processor 33 transmits vibration control position information to the sensor controller 32 (step S25). The vibration control position information is information indicating the position of the vibration control line during touch in the panel surface 3a (position on the sensor 30), and the vibration control position information is expressed using the coordinates in the panel surface 3a. Specifically, the vibration control position information may be a series of coordinates or may be a function representing a line segment. The host processor 33 according to the present embodiment supplies the vibration control position information to the sensor controller 32 to detect the occurrence of the event that the drawing line indicated by the series of pen positions crosses or comes into contact with the vibration control line during touch. In response to the detection of the occurrence of the event, the host processor 33 causes the sensor controller 32, in place of the host processor 33 itself, to execute the process of transmitting the vibration control signal to activate the haptic element 28.

Step S26 is a process of determining whether the position of the vibration control line during touch has changed in the process of step S23 (i.e., the process corresponding to a gesture). If the host processor 33 determines "changed" here, the host processor 33 transmits again, to the sensor controller 32, the vibration control position information indicating the position of the vibration control line during touch available after the change (step S27). The sensor controller 32 that has received the new vibration control position information in this way will execute the process based on the newly received vibration control position information, and this will be described in detail later.

As can be understood by comparing FIGS. 7 and 2, the process executed by the sensor controller 32 according to the present embodiment is different from the process executed by the sensor controller 32 according to the first embodiment in that steps S30 to S38 are executed.

The sensor controller 32 according to the present embodiment first attempts to receive the vibration control position information from the host processor 33 (step S30). The sensor controller 32 then determines whether the vibration control position information is received as a result of the attempt (step S31). If the sensor controller 32 determines "received," the sensor controller 32 stores the received vibration control position information (step S32). Note that if other vibration control position information is already stored at the time of the reception of the vibration control position information, the sensor controller 32 can update the stored vibration control position information with the received vibration control position information.

If the sensor controller 32 determines "not received" in step S31 or after the end of step S32, the sensor controller 32 determines whether the vibration control position information is stored (step S33). If the sensor controller 32 determines "not stored," the sensor controller 32 moves the process to step S1. The sensor controller 32 then executes a process similar to the process of steps S1 to S7 described in FIG. 2. After step S7, the sensor controller 32 executes a process of temporarily storing the derived pen position and the acquired pen data in the memory (step S38). The pen data stored here may include only the pen pressure value. After the end of the repeated process of step S2, the sensor controller 32 returns the process to step S30.

On the other hand, the sensor controller 32 that has determined "stored" in step S33 determines whether the drawing application is currently generating a drawing, according to the stored latest pen pressure value (step S34). Specifically, the sensor controller 32 can determine "not generating a drawing" when the stored latest pen pressure value is 0 and determine "generating a drawing" when the value is larger than 0. The sensor controller 32 that has determined "not generating a drawing" in step S34 moves the process to step S1.

The sensor controller 32 that has determined that the drawing application is generating a drawing in step S34 attempts to detect the occurrence of the event that the drawing line indicated by the series of stored pen positions crosses or comes into contact with the vibration control line during touch indicated by the stored vibration control position information (step S35). Specifically, the sensor controller 32 can generate a spline curve according to one or more pen positions among the series of stored pen positions in which, from the latest pen position, the corresponding pen pressure values are continuously large than 0. The sensor controller 32 can set the generated spline curve as the drawing line to attempt the detection. In addition, the sensor controller 32 may determine whether the pen pressure value corresponding to the second newest pen position among the series of stored pen positions is larger than 0. If the sensor controller 32 determines that the pen pressure value is larger than 0, the sensor controller 32 may generate a line segment connecting the second newest pen position and the latest pen position and set the generated line segment as the drawing line to attempt the detection. Furthermore, the sensor controller 32 may determine that the occurrence of the event is detected if the latest pen position among the series of stored pen positions exists on the vibration control line during touch which is indicated by the vibration control position information.

The sensor controller 32 determines whether the occurrence of the event is detected in step S35 (step S36). If the sensor controller 32 determines "not detected," the sensor controller 32 moves the process to step S1. On the other hand, if the sensor controller 32 determines "detected," the sensor controller 32 transmits, at the top of the frame, the uplink signal US including the vibration control signal, instead of performing step S1 (step S37). The sensor controller 32 then moves the process to step S2. In this way, the vibration control signal is supplied to the integrated circuit 24 of the pen 2 through the uplink signal US, and the integrated circuit 24 activates the haptic element 28 at the timing indicated by the vibration control signal. As a result, the user receives a notification through the vibration, and the user can recognize that the entered line crosses or comes into contact with the vibration control line during touch.

As described above, according to the position detection system 1 of the present embodiment, the sensor controller 32 detects the occurrence of the event that the vibration control line during touch set in the screen crosses or comes into contact with the drawing line indicated by the input stroke data. In response to the detection of the occurrence of the event, the sensor controller 32 uses the uplink signal US to transmit the vibration control signal to thereby activate the haptic element 28 of the pen 2. Thus, the tactile feedback can be generated in a timely manner when the pen position crosses the boundary of the desired area. As a result, the user can recognize in a timely manner that the entered line crosses or comes into contact with the vibration control line during touch.

The reason that the prediction of the pen position (step S17 of FIG. 4) performed by the host processor 33 according to the first embodiment is not performed in the present embodiment is that it can be expected that the control of the haptic element 28 by the uplink signal US is rarely delayed. If the delay cannot be ignored, the sensor controller 32 may predict the pen position just like the host processor 33 according to the first embodiment and may also use the result of the prediction to make an attempt in step S35.

Next, the position detection system 1 according to a third embodiment of the present disclosure will be described. The position detection system 1 according to the present embodiment is different from the position detection system 1 according to the first embodiment in that the haptic element 28 is activated also in some cases when the pen 2 hovers in the air over the panel surface 3a. The position detection system 1 according to the present embodiment is similar to the position detection system 1 according to the first embodiment including the configuration of the position detection system 1 illustrated in FIG. 1, and mainly the difference from the position detection system 1 according to the first embodiment will be described.

Figure 8:
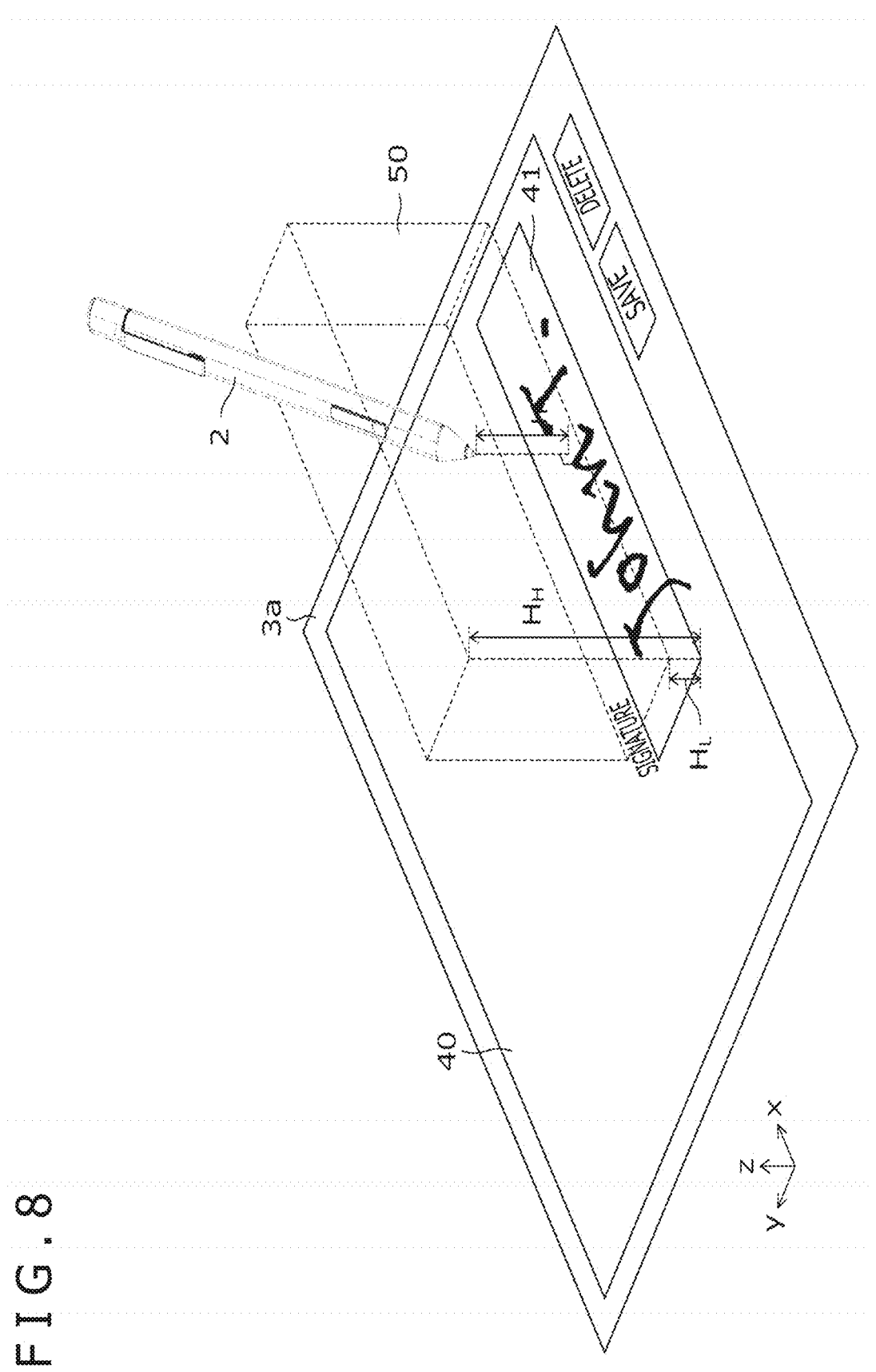
FIG. 8 depicts an example of setting a vibration control area during hover on the screen illustrated in FIG. 3.

FIG. 8 depicts an example of setting a space area for vibrating the pen 2 (hereinafter, referred to as a "vibration control area during hover") on the screen illustrated in FIG. 3. In the example of FIG. 8, a space area from a height (distance in z direction illustrated in FIG. 3) $H_L$ to a height $H_H$ ($>H_L$) in the air over the signature field 41 is a vibration control area during hover 50. A specific process for realizing the tactile feedback in a timely manner when the position of the front end of the pen 2 is in the vibration control area during hover will be described.

Figure 9:
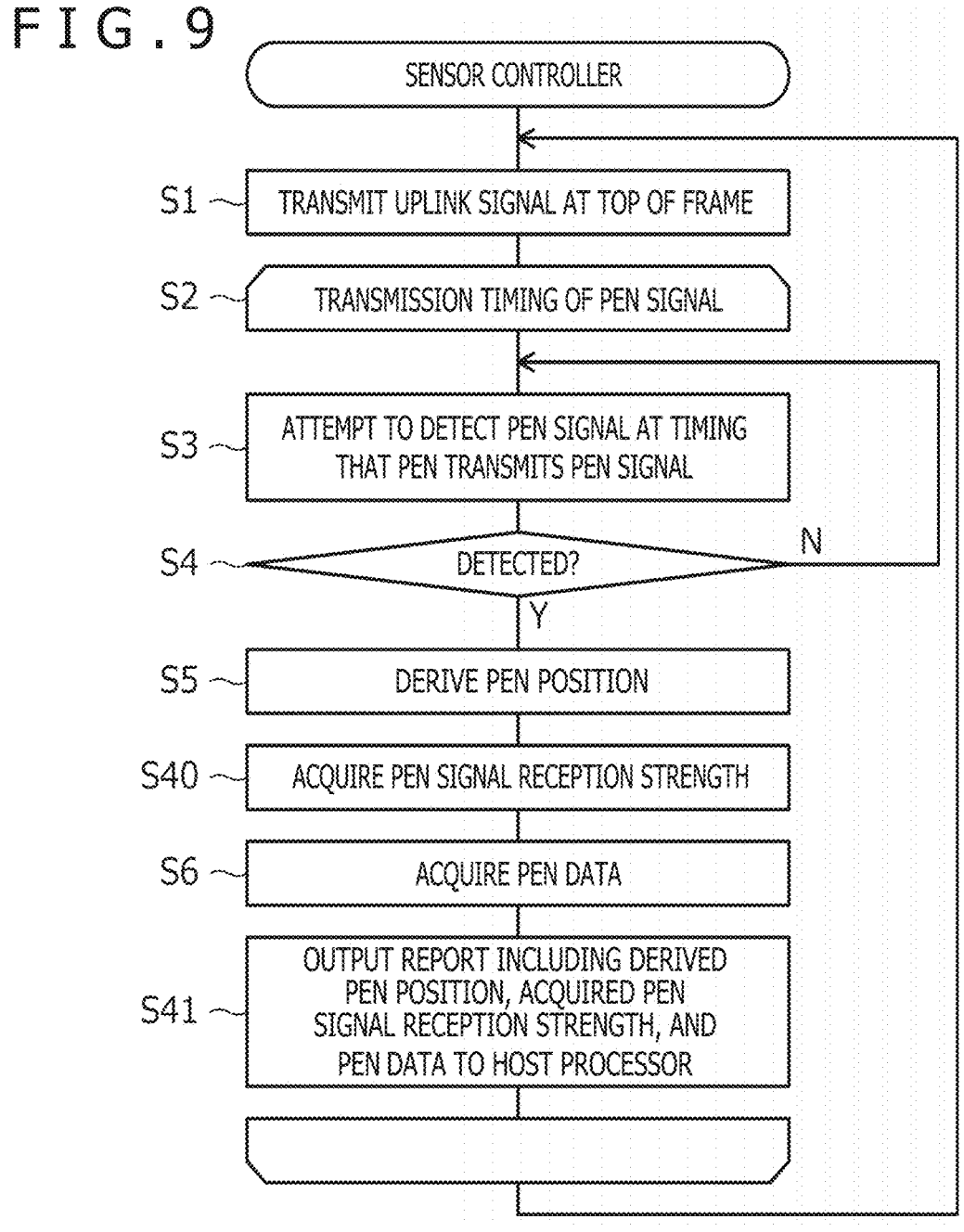
FIG. 9 is a process flow chart illustrating a process executed by the sensor controller according to a third embodiment of the present disclosure.
Figure 10:
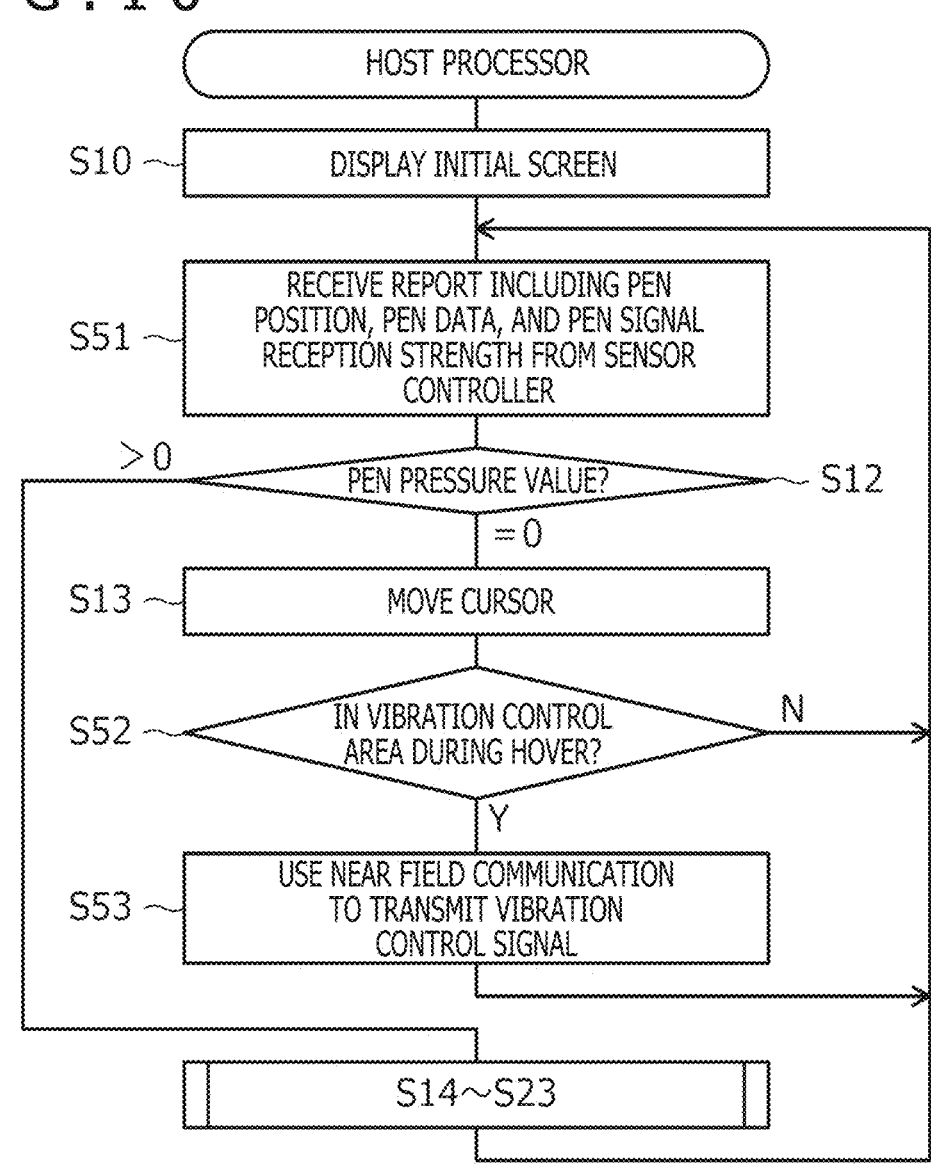
FIG. 10 is a process flow chart illustrating a process executed by the host processor according to the third embodiment of the present disclosure.

FIG. 9 is a process flow chart illustrating a process executed by the sensor controller 32 according to the present embodiment. FIG. 10 is a process flow chart illustrating a process executed by the host processor 33 according to the present embodiment. The process illustrated in FIG. 10 is also a process executed by the host processor 33 according to an instruction of the drawing application as in FIG. 4.

As can be understood by comparing FIGS. 9 and 2, the process executed by the sensor controller 32 according to the present embodiment is different from the process executed by the sensor controller 32 according to the first embodiment in that step S40 is executed after step S5, and step S41 is executed in place of step S7.

In step S40, the sensor controller 32 acquires a reception strength of the pen signal PS received from the pen 2 (hereinafter, referred to as the "pen signal reception strength"). The sensor controller 32 may acquire, as the pen signal reception strength, the largest one of the reception strengths of the pen signal PS at the plurality of X electrodes and the plurality of Y electrodes included in the sensor 30. The sensor controller 32 may obtain the peak values in the normal distribution curves in the x direction and the y direction and acquire, as the pen signal reception strength, the larger one of the obtained two peak values.

In step S41, the sensor controller 32 outputs, to the host processor 33, a report including the pen position derived in step S5, the pen signal reception strength acquired in step S40, and the pen data acquired in step S6. The process is different from step S7 illustrated in FIG. 2 in that the pen signal reception strength is added to the report. The host processor 33 supplied with the pen signal reception strength uses the pen signal reception strength to derive the height of the pen 2 (distance in the z direction from the panel surface 3a to the pen tip).

As can be understood by comparing FIGS. 10 and 4, the process executed by the host processor 33 according to the present embodiment is different from the process executed by the host processor 33 according to the first embodiment in that step S51 is executed in place of step S11, and steps S52 and S53 are executed after step S13.

Step S51 is different from step S11 illustrated in FIG. 4 in that the pen signal reception strength is included in the report received from the sensor controller 32. The details of the pen signal reception strength are as described above.

After moving the cursor in step S13, the host processor 33 according to the present embodiment determines whether the front end of the pen 2 is positioned in the vibration control area during hover (step S52). Specifically, the host processor 33 first derives the pen height based on the pen signal reception strength. Specifically, a table or a function associating the pen height and the pen signal reception strength can be stored, and the host processor 33 can use the table or the function to convert the pen signal reception strength into the pen height. The host processor 33 then determines whether the spatial coordinates indicated by the pen position and the pen height are positioned in the vibration control area during hover to thereby make the determination of step S52. In the example of the vibration control area during hover 50 of FIG. 8, the host processor 33 determines that the front end of the pen 2 is positioned in the vibration control area during hover when the pen position is in the signature field 41 and the pen height is equal to or greater than $H_L$ but equal to or smaller than $H_H$. If the host processor 33 determines that the front end of the pen 2 is not positioned in the vibration control area during hover in step S52, the host processor 33 returns to step S51 and continues the process.

On the other hand, the host processor 33 that has determined that the front end of the pen 2 is positioned in the vibration control area during hover in step S52 executes a process similar to step S20 of FIG. 4 to transmit a predetermined vibration control signal to the pen 2 by using the near field communication (step S53). In this way, the haptic element 28 of the pen 2 is activated when the front end of the pen 2 is in the vibration control area during hover.

As described above, according to the position detection system 1 of the present embodiment, the host processor 33 determines whether the front end of the pen 2 is in the vibration control area during hover. In response to the determination of "yes," the host processor 33 transmits the vibration control signal through the near field communication to activate the haptic element 28 of the pen 2. Thus, the tactile feedback can be generated in a timely manner when the front end of the pen 2 is in the vibration control area during hover. As a result, the user can recognize in a timely manner that the front end of the pen 2 is in the vibration control area during hover.

Although the host processor 33 executes the series of processes of determining whether the front end of the pen 2 is in the vibration control area during hover and transmitting the vibration control signal to activate the haptic element 28 of the pen 2 when the host processor 33 determines that the front end of the pen 2 is in the vibration control area during hover in the example described in the present embodiment, these processes may be executed by the sensor controller 32. In this case, information indicating the vibration control area during hover can be added to the vibration control position information illustrated in FIG. 7. The sensor controller 32 can determine whether the spatial coordinates indicated by the pen position and the pen height are positioned in the vibration control area during hover. If the sensor controller 32 determines that the spatial coordinates are positioned in the area, the sensor controller 32 can use the uplink signal US to transmit the vibration control signal as in the example of FIG. 7.

Next, the position detection system 1 according to a fourth embodiment of the present disclosure will be described. In the position detection system 1 according to the present embodiment, the timing of the transmission of the vibration control signal by the sensor controller 32 is different from that of the position detection system 1 according to the second embodiment. The position detection system 1 according to the present embodiment is also different from the position detection system 1 according to the second embodiment in that the sensor controller 32 generates a vibration control signal indicating various vibration patterns. The position detection system 1 according to the present embodiment is similar to the position detection system 1 according to the second embodiment in other respects including the configuration of the position detection system 1 illustrated in FIG. 1, and mainly the differences from the position detection system 1 according to the second embodiment will be described.

Figure 11:
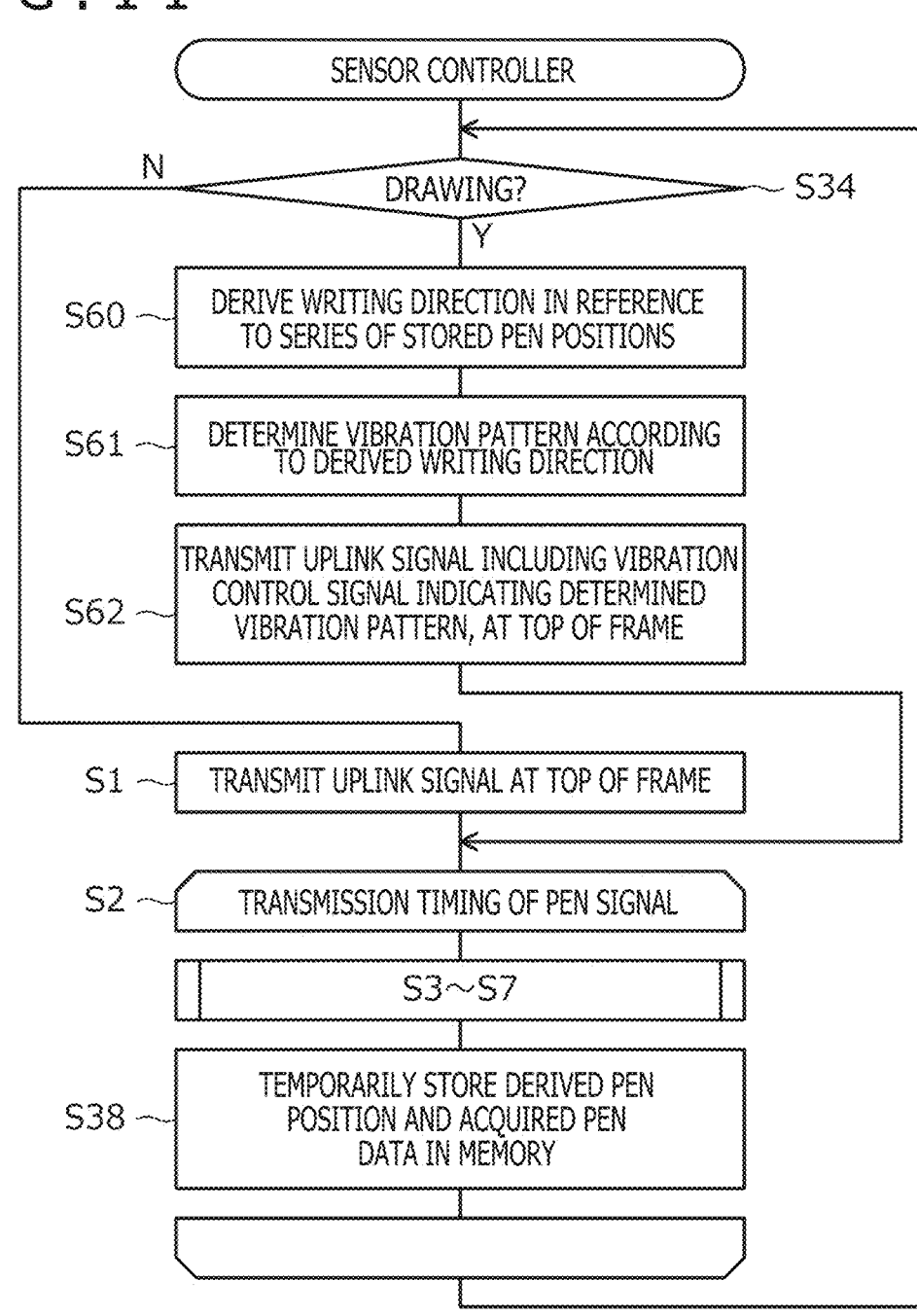
FIG. 11 is a process flow chart illustrating a process executed by the sensor controller according to a fourth embodiment of the present disclosure.

FIG. 11 is a process flow chart illustrating a process executed by the sensor controller 32 according to the present embodiment. As can be understood by comparing FIGS. 11 and 7, the process executed by the sensor controller 32 according to the present embodiment is different from the process executed by the sensor controller 32 according to the second embodiment in that steps S30 to S33 are not executed, and steps S60 to S62 are executed in place of steps S35 to S37.

Step S60 is a process of deriving a writing direction of the pen 2 based on the series of stored pen positions (a history of pen position). For example, the direction of the movement speed vector derived by Equation (1) can be the writing direction derived in step S60.

The sensor controller 32 that has derived the writing direction determines the vibration pattern of the haptic element 28 according to the derived writing direction (step S61). The sensor controller 32 transmits, at the top of the frame, the uplink signal US including the vibration control signal indicating the determined vibration pattern (step S62). This can cause the haptic element 28 to vibrate in a vibration pattern that varies depending on the writing direction.

As described above, according to the position detection system 1 of the present embodiment, the sensor controller 32 derives the writing direction of the pen 2 in reference to the history of the pen position and transmits the vibration control signal indicating the vibration pattern corresponding to the derived writing direction of the pen 2. Therefore, the friction between the pen tip and the paper fiber that changes according to the change in the movement direction of the pen 2 can be reproduced by the vibration of the pen 2. This can reproduce the realistic feel of writing.

Although the vibration pattern of the haptic element 28 is determined according to the writing direction in the present embodiment, the vibration pattern of the haptic element 28 may be determined based on other information. For example, the vibration pattern of the haptic element 28 may be determined according to a change in the writing direction (for example, the direction of the acceleration vector derived by Equation (5)), the pen pressure value received from the pen 2, the tilt value, or the azimuth value. The vibration pattern of the haptic element 28 may be determined in reference to a combination of two or more pieces of the information.

Although the sensor controller 32 derives the writing direction, determines the vibration pattern, and transmits the vibration control signal in the description of the present embodiment, the host processor 33 may execute part or all of the processes. In this case, the near field communication can be used to transmit the vibration control signal as in the first embodiment.

Next, the position detection system 1 according to a fifth embodiment of the present disclosure will be described. The position detection system 1 according to the present embodiment is different from the position detection system 1 according to the first embodiment in that the haptic element 28 is activated according to various user operations related to a paint application that is a type of the drawing application. The position detection system 1 according to the present embodiment is similar to the position detection system 1 according to the first embodiment in other respects including the configuration of the position detection system 1 illustrated in FIG. 1, and mainly the difference from the position detection system 1 according to the first embodiment will be described.

Figure 12:
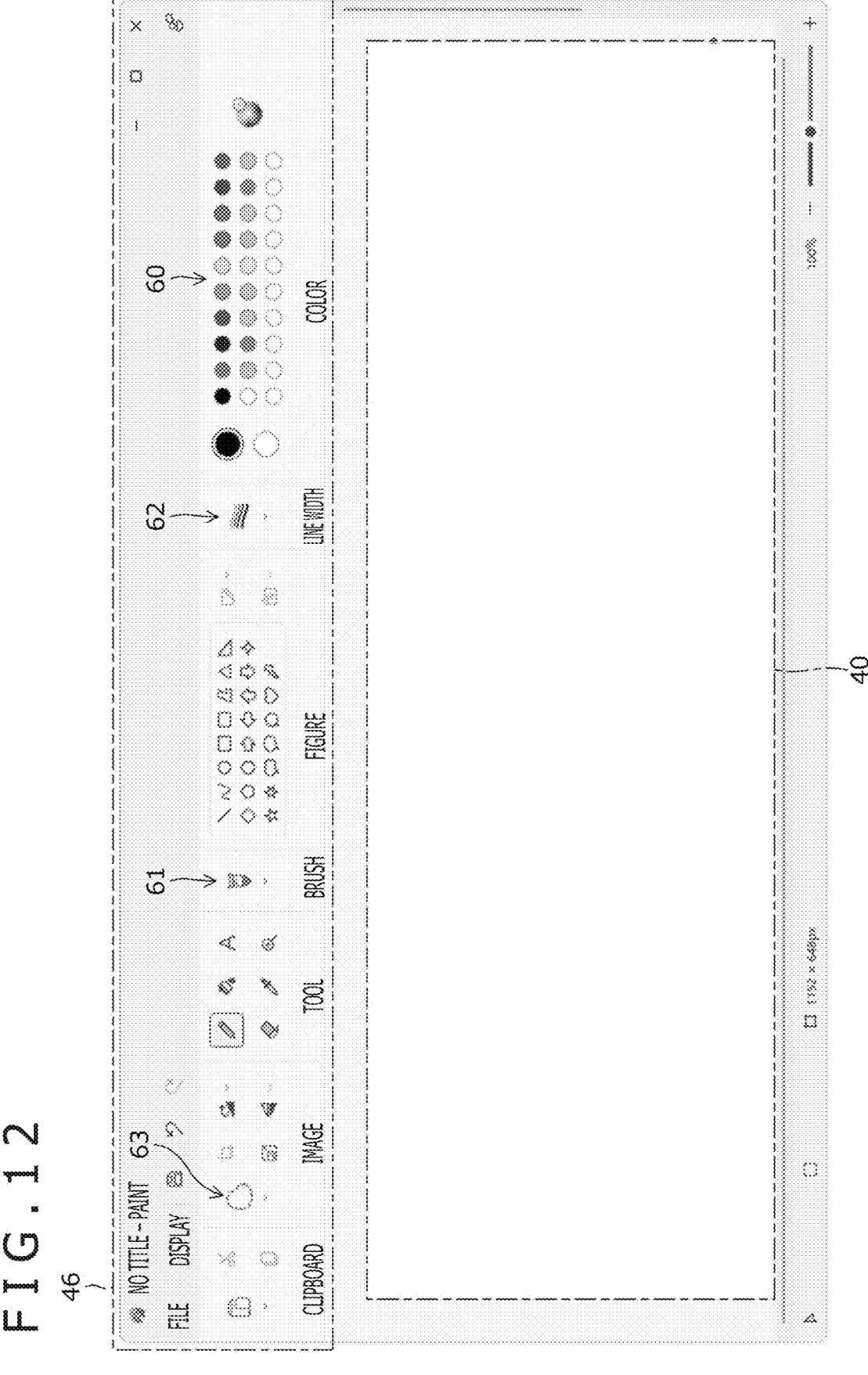
FIG. 12 depicts an example of a paint screen displayed on the panel surface by a paint application according to a fifth embodiment of the present disclosure.

FIG. 12 depicts an example of a screen displayed on the panel surface 3a by the paint application (hereinafter, referred to as the "paint screen"). Note that examples of the screen illustrated in FIG. 12 and FIGS. 13 to 15 described later illustrate screenshots of software "paint" installed on Windows 11 (registered trademark) that is an operating system sold by Microsoft (registered trademark) Corporation. As illustrated in FIG. 12, the paint screen includes a menu screen 46 in addition to the drawing area 40. The menu screen 46 includes various icons including a color selection palette 60 including a plurality of color icons, a brush selection menu launch icon 61, a line width selection menu launch icon 62, and an area selection menu launch icon 63. The icons correspond to processes different from each other. When the user uses the pen 2 to tap an icon in the menu screen 46, the host processor 33 executes the corresponding process. Each icon will be described in detail.

First, the color selection palette 60 will be described. The color selection palette 60 is an icon for the user to designate the color of the line to be drawn. Colors different from each other are associated with color icons included in the color selection palette 60 and stored in the host processor 33, and the color corresponding to one of the plurality of color icons is stored in the host processor 33 as the color (hereinafter, referred to as the "valid color") of the line to be drawn in step S15 illustrated in FIG. 4. When the user uses the pen 2 to tap one of the color icons, the host processor 33 executes a process of updating the stored valid color with the color stored in association with the tapped color icon. As a result of the process executed by the host processor 33, the user can tap the color icon to designate the color of the line to be drawn.

In addition, vibration patterns different from each other are associated with the color icons included in the color selection palette 60 and stored in the host processor 33, and the area in the air over each color icon is stored as the vibration control area during hover in the host processor 33. The host processor 33 executes the same process as that in the third embodiment to determine whether the position of the front end of the pen 2 is in the vibration control area during hover. If the host processor 33 determines that the position is in the vibration control area during hover, the host processor 33 executes a process of using the vibration pattern stored in association with the corresponding color icon, to vibrate the haptic element 28. As a result, the user can recognize that the pen tip is positioned in the air over the color icon. When the color icon directly below the pen tip (that is, the color icon to be tapped when the pen is put down at the position) is changed, the vibration allows the user to recognize the change.

The configuration of the vibration control signal according to the present embodiment will be described in detail here. The vibration control signal according to the present embodiment includes a vibration pattern selection signal indicating the vibration pattern (vibration waveform) of the haptic element 28 and a reproduction method instruction signal indicating the reproduction method of the vibration pattern. Examples of the reproduction method include a method of reproducing just once the vibration pattern indicated by the vibration pattern selection signal and a method of repeatedly reproducing the vibration pattern indicated by the vibration pattern selection signal while the user moves the pen 2 (corresponding to an operation of moving the pen tip on the panel surface 3a with the pen tip in contact with the panel surface 3a). The reproduction method of the case where the position of the front end of the pen 2 is positioned in the air over the color icon is the former method of reproducing the vibration pattern just once. Every time the host processor 33 transmits the vibration control signal, the host processor 33 selects one vibration pattern and one reproduction method and transmits the vibration control signal including the vibration pattern selection signal indicating the selected vibration pattern and the reproduction method instruction signal indicating the selected reproduction method. The integrated circuit 24 of the pen 2 that has received the vibration control signal executes a process of using the vibration pattern indicated by the vibration pattern selection signal and vibrating the haptic element 28 with use of the reproduction method indicated by the reproduction method instruction signal.

The brush selection menu launch icon 61 is an icon for the user to designate the type of the line to be drawn (hereinafter, referred to as the "brush").

Figure 13:
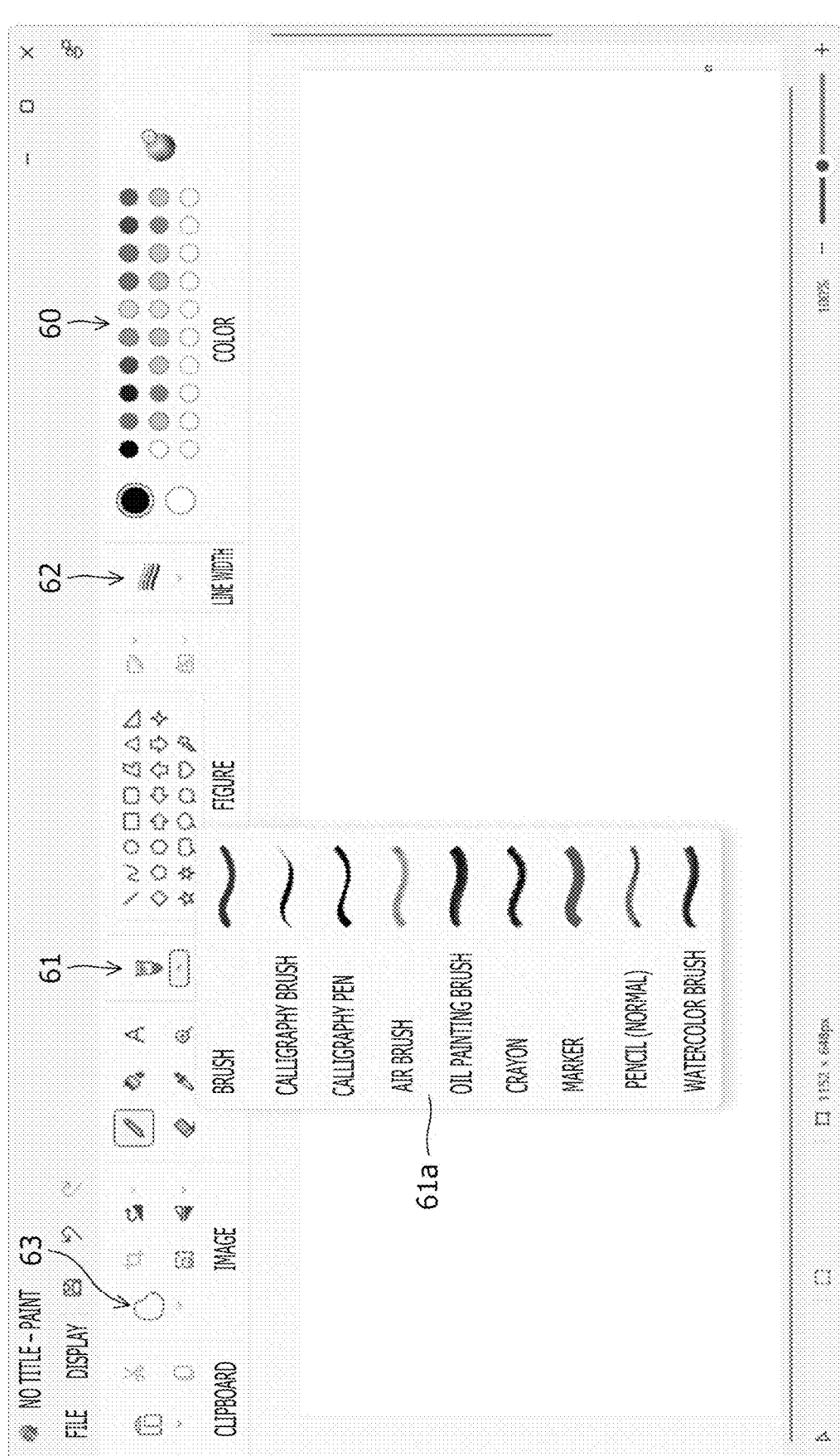
FIG. 13 depicts a brush selection menu displayed when a user uses a pen to tap a brush selection menu launch icon.

FIG. 13 depicts a brush selection menu 61a displayed when the user uses the pen 2 to tap the brush selection menu launch icon 61. As illustrated in FIG. 13, the brush selection menu 61a includes a plurality of brush icons. Brushes different from each other and vibration patterns different from each other are associated with the plurality of brush icons and stored in the host processor 33. The brush corresponding to one of the plurality of brush icons is stored in the host processor 33 as the type of the line (hereinafter, referred to as the "valid brush") to be drawn in step S15 illustrated in FIG. 4 (and FIG. 17 described later). When the user uses the pen 2 to tap one of the brush icons, the host processor 33 executes a process of updating the stored valid brush with the brush stored in association with the tapped brush icon. As a result of the process executed by the host processor 33, the user can tap the brush icon to designate the type of the line to be drawn. In addition, when the user uses the pen 2 to tap one of the brush icons, the host processor 33 executes a process of using the vibration pattern stored in association with the tapped brush icon and vibrating the haptic element 28. As a result, the vibration allows the user to understand whether the user has selected the correct brush.

The host processor 33 may also change the valid brush when the press button switches 27a and 27b of the pen 2 are pressed. For example, brushes different from each other can be associated with the press button switches 27a and 27b and stored in advance in the host processor 33. When the pen data indicates that the press button switch 27a is on, the host processor 33 can set the brush stored in association with the press button switch 27a as the valid brush. When the pen data indicates that the press button switch 27b is on, the host processor 33 can set the brush stored in association with the press button switch 27b as the valid brush. In this way, the user can use the switches on hand to switch the valid brush. In addition, when the press button switches 27a and 27b are pressed to change the valid brush, the host processor 33 may execute a process of using the vibration pattern stored in association with the brush icon corresponding to the brush after the change and vibrating the haptic element 28. As a result, the vibration allows the user to understand whether the user has selected the correct brush when the user presses the press button switches 27a and 27b to change the valid brush.

FIG. 12 will be further described. The line width selection menu launch icon 62 is an icon for the user to designate the width of the line to be drawn.

FIG. 14 depicts a line width selection menu 62a displayed when the user uses the pen 2 to tap the line width selection menu launch icon 62. As illustrated in FIG. 14, the line width selection menu 62a includes a plurality of line width icons. Line widths different from each other and vibration patterns different from each other are associated with the plurality of line width icons and stored in the host processor 33. The line width corresponding to one of the plurality of line width icons is also stored in the host processor 33 as the width of the line (hereinafter, referred to as the "valid line width") to be drawn in step S15 illustrated in FIG. 4. When the user uses the pen 2 to tap one of the line width icons, the host processor 33 executes a process of updating the stored valid line width with the line width stored in association with the tapped line width icon. As a result of the process executed by the host processor 33, the user can tap the line width icon to designate the width of the line to be drawn. In addition, when the user uses the pen 2 to tap one of the line width icons, the host processor 33 executes a process of using the vibration pattern stored in association with the tapped line width icon and vibrating the haptic element 28. As a result, the vibration allows the user to understand whether the user has selected the correct line width.

It is preferable to associate the line width icons with vibration patterns of different frequencies of vibration. More specifically, it is preferable that the thicker the line width, the lower the frequency of the associated vibration pattern. In this way, the user can naturally understand the line width tapped by the user.

FIG. 12 will be described again. The area selection menu launch icon 63 is an icon for the user to designate an area in the drawing area 40.

FIG. 15 depicts an area selection menu 63a displayed when the user uses the pen 2 to tap the area selection menu launch icon 63. As illustrated in FIG. 15, the area selection menu 63a includes a plurality of selection method icons. Selection methods different from each other are associated with the plurality of selection method icons and stored in the host processor 33. Some of the selection methods will be specifically described. For example, "rectangle" is a method of moving the pen 2 to select a rectangular area in which a diagonal is a line segment connecting the position of the pen tip at the start of the movement and the current position of the pen tip. In addition, "free format" is a method of using the pen 2 to depict a closed curve and select an area surrounded by the closed curve. The host processor 33 executes a process of temporarily storing the selection method corresponding to one of the plurality of selection method icons tapped by the pen 2, and in the next move, executing a selection operation based on the stored selection method. The host processor 33 also executes a process of using a predetermined vibration pattern to vibrate the haptic element 28 while the user moves the pen 2 to perform the selection operation. As a result, the vibration allows the user to understand that the user movement of the pen 2 is for performing the selection operation.

FIG. 15 also illustrates an example of a process executed by the host processor 33 after the "rectangle" icon is tapped among the plurality of selection method icons included in the area selection menu 63a. A trajectory 63b illustrated in FIG. 15 is a trajectory of a movement of the pen 2 made by the user just after the "rectangle" icon is tapped. The host processor 33 executes a process of acquiring, as a selected area, a rectangular area 63c in which a diagonal is a line segment connecting a start position SP of the trajectory 63b and a current position CP of the trajectory 63b. According to the process, the size and the shape of the area 63c change from moment to moment while the movement of the pen 2 continues. Once the movement of the pen 2 is finished, the host processor 33 executes a process of confirming the area 63c at this point as the selected area and displaying the area 63c. As a result of the series of processes executed by the host processor 33, the user can tap the selection method icon and move the pen 2 to designate the selection area.

FIGS. 16 to 18 are process flow charts illustrating a process executed by the host processor 33 according to an instruction of the paint application. The process executed by the host processor 33 of the present embodiment to activate the haptic element 28 according to various user operations related to the paint application will be described in detail with reference to FIGS. 16 to 18.

First, the host processor 33 in FIG. 16 executes the process of steps S10, S51, and S12 as in the case of FIG. 10. However, the initial screen displayed in step S10 in this case is the paint screen illustrated in FIG. 12.

The host processor 33 that has determined that the pen pressure value is 0 in step S12 executes the process of steps S13 and S52 as in the case of FIG. 10. However, the vibration control area during hover to be determined in step S52 in this case includes areas set in the air over the plurality of color icons included in the color selection palette 60 illustrated in FIG. 12. If the host processor 33 determines that the front end of the pen 2 is not positioned in the vibration control area during hover in step S52, the host processor 33 moves the process to step S72.

On the other hand, if the host processor 33 determines that the front end of the pen 2 is positioned in the vibration control area during hover in step S52, the host processor 33 selects the vibration pattern according to the vibration control area during hover in which the front end of the pen 2 is positioned (step S70). Specifically, if the vibration control area during hover in which the front end of the pen 2 is positioned is set in the air over one of the color icons, the host processor 33 can select the vibration pattern stored in association with the color icon. If the vibration control area during hover in which the front end of the pen 2 is positioned is the vibration control area during hover 50 illustrated in FIG. 8, the host processor 33 can select the vibration pattern stored in association with the vibration control area during hover 50.

The host processor 33 uses the near field communication to transmit the vibration control signal to the pen 2 (step S71). The vibration control signal transmitted here includes the vibration pattern selection signal indicating the vibration pattern selected in step S70 and the reproduction method instruction signal indicating the reproduction method of reproducing just once the vibration pattern indicated by the vibration pattern selection signal. In this way, the user receives a notification through the vibration, and the user can recognize that the pen tip is positioned in the air over the color icon. When the color icon directly below the pen tip (that is, the color icon to be tapped when the pen is put down at the position) is changed, the vibration allows the user to recognize the change.

The host processor 33 attempts to detect a predetermined user operation (step S72) and determines whether the predetermined user operation is detected (step S73). The user operation to be detected here is, for example, a press operation of the press button switches 27a and 27b provided on the pen 2. In this case, the host processor 33 can detect the user operation based on the pen data received in step S51.

The host processor 33 that has determined "detected" in step S73 executes the process corresponding to the detected user operation (step S74). When the detected user operation is the press operation of the press button switches 27a and 27b and the brushes are stored in association with the press button switches 27a and 27b, the process executed by the host processor 33 is the process of switching the valid brush to the brush stored in association with the pressed press button switch.

The host processor 33 that has executed the process corresponding to the detected user operation determines whether the detected user operation is an operation that would cause vibration (step S75). As a result of the determination, if the host processor 33 determines that the user operation "is an operation that would cause vibration," the host processor 33 selects the vibration pattern (step S76). For example, when the press button switches 27a and 27b are pressed to change the valid brush, the host processor 33 can select the vibration pattern stored in association with the brush icon corresponding to the brush after the change.

The host processor 33 uses the near field communication to transmit the vibration control signal to the pen 2 (step S77). The vibration control signal transmitted here includes the vibration pattern selection signal indicating the vibration pattern selected in step S76 and the reproduction method instruction signal indicating the reproduction method of reproducing just once the vibration pattern indicated by the vibration pattern selection signal. In this way, the user receives a notification through the vibration, and the user can recognize that the operation performed by the user is accepted. When the brush is changed, the vibration allows the user to recognize the change.

If the host processor 33 determines "not detected" in step S73, determines "not an operation that would cause vibration" in step S75, or finishes the process of step S77, the host processor 33 returns to step S51 and continues the process.

The host processor 33 that has determined that the pen pressure value is larger than 0 in step S12 determines whether the current pen position is in the drawing area as illustrated in FIG. 17 (step S14). If the host processor 33 determines "in the drawing area" in the determination, the host processor 33 determines the current mode of the paint application (step S80). Examples of the mode here include a drawing mode for drawing a line with the pen 2 and an operation mode for performing various operations with the pen 2.

The host processor 33 that has determined that the current mode of the paint application is the drawing mode generates or updates the stroke data based on the pen position and the pen data acquired in step S51, renders the stroke data obtained as a result of the generation or the update, and draws (renders) the stroke data on the panel surface 3a as in the case of FIG. 4 (step S15).

The host processor 33 attempts to detect the figure (shape) that would cause vibration (step S81) and determines whether the figure is detected (step S82). The figure to be detected here is, for example, a figure with an arrow shape or any polygon. The feature of the figure that would cause vibration and the vibration pattern are associated and stored in advance in the host processor 33, and the host processor 33 attempts to detect the figure coinciding with the stored feature or a figure resembling the stored feature in step S81. When the figure to be detected is any polygon, the host processor 33 may store the vibration pattern in association with the number of corners of the figure.

The host processor 33 that has determined "detected" in step S82 selects the vibration pattern stored in association with the detected figure (step S83). The host processor 33 uses the near field communication to transmit the vibration control signal to the pen 2 (step S84). The vibration control signal transmitted here includes the vibration pattern selection signal indicating the vibration pattern selected in step S83 and the reproduction method instruction signal indicating the reproduction method of reproducing just once the vibration pattern indicated by the vibration pattern selection signal. In this way, the user receives a notification through the vibration, and the user can obtain an effect corresponding to the predetermined figure. For example, the user drawing an arrow can have a feeling of shooting a bow. The user drawing a polygon can have a feel corresponding to the number of corners (for example, a harder feel for the polygon with fewer corners, a softer feel for the polygon with more corners). If the host processor 33 determines "not detected" in step S82 or finishes step S84, the host processor 33 moves the process to step S51 of FIG. 16.

The host processor 33 that has determined that the current mode of the paint application is the operation mode in step S80 determines whether the pen 2 is moving (step S85). As a result of the determination, the host processor 33 that has determined "not moving" moves the process to step S51 of FIG. 16. On the other hand, the host processor 33 that has determined "moving" starts a process corresponding to the move (step S86). If, for example, the user has just tapped one of the selection method icons in the area selection menu 63a, the process is a process of displaying the selection area (for example, the area 63c illustrated in FIG. 15) that changes from moment to moment. Other than this, the process may be, for example, a process of enlarging the displayed figure or a process of rotating the displayed figure.

The host processor 33 that has started the process corresponding to the move determines whether the started process is a process that would cause vibration (step S87). As a result of the determination, if the host processor 33 determines "process that would cause vibration," the host processor 33 selects the vibration pattern (step S88). For example, if the started process is the selection operation of the area, the host processor 33 can select a predetermined vibration pattern stored in association with the selection operation. The host processor 33 can also start a process of enlarging the displayed figure or a process of rotating the displayed figure. In such a case, the host processor 33 can select a predetermined vibration pattern stored in association with the process.

The host processor 33 uses the near field communication to transmit the vibration control signal to the pen 2 (step S89). The vibration control signal transmitted here includes the vibration pattern selection signal indicating the vibration pattern selected in step S88 and the reproduction method instruction signal indicating the reproduction method of repeatedly reproducing the vibration pattern indicated by the vibration pattern selection signal while the pen 2 continues to move. In this way, the vibration is continuously provided to the user while the movement continues, and the user can recognize that the process corresponding to the movement is continued.

The host processor 33 determines whether the movement is finished (step S90). The host processor 33 repeats the determination while the movement of the pen 2 is continued. If the host processor 33 determines that the movement is finished, the host processor 33 ends the process started in step S86 (step S91) and moves the process to step S51 of FIG. 16.

The host processor 33 that has determined "not in the drawing area" in step S14 attempts to detect a gesture (step S21) and determines whether the gesture is detected (step S22) as illustrated in FIG. 18. Examples of the gesture to be detected here include tapping of one of the color icons in the color selection palette 60, the brush selection menu launch icon 61, the line width selection menu launch icon 62, or the area selection menu launch icon 63 illustrated in FIG. 12, tapping of one of the brush icons in the brush selection menu 61a illustrated in FIG. 13, and tapping of one of the line width icons in the line width selection menu 62a illustrated in FIG. 14.

The host processor 33 that has determined "detected" in step S22 executes the process corresponding to the gesture (step S23) and determines whether the detected gesture is an operation that would cause vibration (step S100). The process executed in step S23 is, for example, a process of setting, as the valid color, the color corresponding to the color icon if the gesture is tapping of the color icon. The process is, for example, a process of setting, as the valid brush, the brush corresponding to the brush icon if the gesture is tapping of the brush icon. The process is, for example, a process of setting, as the valid line width, the line width corresponding to the line width icon if the gesture is tapping of the line width icon. The process is, for example, a process of launching the corresponding menu (such as the brush selection menu 61a illustrated in FIG. 13) if the gesture is tapping of the brush selection menu launch icon 61, the line width selection menu launch icon 62, or the area selection menu launch icon 63. In step S100, the host processor 33 can determine that the detected gesture "is an operation that would cause vibration" if the vibration pattern is stored in association with the tapped icon, and the host processor 33 can determine that the detected gesture "is not an operation that would cause vibration" if the vibration pattern is not stored in association with the tapped icon.

The host processor 33 that has determined that the detected gesture "is an operation that would cause vibration" in step S100 selects the vibration pattern corresponding to the detected gesture (step S101). Specifically, the host processor 33 is only required to select, for example, the vibration pattern stored in association with the tapped icon.

The host processor 33 uses the near field communication to transmit the vibration control signal to the pen 2 (step S102). The vibration control signal transmitted here includes the vibration pattern selection signal indicating the vibration pattern selected in step S101 and the reproduction method instruction signal indicating the reproduction method of reproducing just once the vibration pattern indicated by the vibration pattern selection signal. In this way, the user receives a notification through the vibration, and the user can recognize that the gesture of the user is accepted by the paint application.

As described above, according to the position detection system 1 of the present embodiment, the haptic element 28 in the pen 2 can be activated according to various user operations related to the paint application.

Although the haptic element 28 in the pen 2 is activated in the example described in the present embodiment, a haptic element may be provided in the pen position detection apparatus 3, and the haptic element in the pen position detection apparatus 3 may be activated instead of the haptic element 28 or in addition to the haptic element 28. In this way, the user can receive a notification through the vibration of the panel surface 3a, and the user can also receive a notification through the vibration when the user uses the pen 2 not including the haptic element 28 or uses a finger to perform an operation.

Although various embodiments of the present disclosure have been described, the present disclosure is not limited to the described embodiments, and can be carried out in various further embodiments or modifications based on the technical principles disclosed herein.

For example, although the processes executed by the host processor 33 according to the drawing application have been described in the embodiments, the host processor 33 may execute part or all of the processes according to the operating system.

Although the pen 2 acquires the pen pressure value based on the pressure detected by the pressure sensor 22 that detects the pressure applied to the pen tip in the embodiments, the pen 2 may acquire the pen pressure value based on the pressure detected by a pressure sensor that detects the pressure applied to a button provided on the surface of the pen housing. In this way, the present disclosure can also be applied to a pen pressure value artificially generated in a space of extended reality (XR), such as virtual reality (VR), augmented reality (AR), and mixed reality (MR).

The invention claimed is:

1. A system, comprising:
a pen; and
a pen position detection apparatus, wherein
the pen includes
  a signal transmitter that transmits a pen signal,
  a signal receiver that receives a vibration control signal, and
  a haptic element that is activated in response to the vibration control signal, and the pen position detection apparatus is configured to
detect the pen signal to derive a pen position,
detect occurrence of an event that a drawing line indicated by a series of derived pen positions crosses or comes into contact with a predetermined line segment, and transmit the vibration control signal to activate the haptic element in response to the detection of the occurrence of the event.

2. The system according to claim 1, wherein the pen signal includes a pen pressure value, and the pen position detection apparatus is configured to acquire the pen pressure value from the pen signal, in response to the detection of the occurrence of the event in a case the acquired pen pressure value indicates that the pen is sliding, transmit the vibration control signal to activate the haptic element, and not activate the haptic element in a case the acquired pen pressure value does not indicate that the pen is sliding.

3. The system according to claim 2, wherein the pen position detection apparatus includes a sensor controller and a host processor, the sensor controller is configured to detect the pen signal to derive the pen position, and output the derived pen position to the host processor, and the host processor is configured to predict a next pen position based on the series of pen positions supplied from the sensor controller, to detect the occurrence of the event, and transmit the vibration control signal in response to the detection of the occurrence of the event.

4. The system according to claim 3, wherein the sensor controller is configured to acquire the pen pressure value from the pen signal, and output the acquired pen pressure value, along with the pen position, to the host processor, and the host processor is configured to transmit the vibration control signal in response to the detection of the occurrence of the event in a case the pen pressure value supplied from the sensor controller indicates that the pen is sliding.

5. The system according to claim 3, wherein the vibration control signal includes information for activating the haptic element at a predicted timing.

6. The system according to claim 3, wherein the host processor uses near field communication to transmit the vibration control signal.

7. The system according to claim 2, wherein the pen position detection apparatus includes a sensor controller and a host processor, and the sensor controller is configured to hold vibration control position information indicating a position on a sensor corresponding to the predetermined line segment, detect the pen signal using the sensor to derive the pen position, output the derived pen position to the host processor, detect the occurrence of the event based on the vibration control position information, and transmit the vibration control signal in response to the detection of the occurrence of the event.

8. The system according to claim 7, wherein the sensor controller is configured to demodulate the pen signal received through the sensor, to acquire the pen pressure value, and transmit the vibration control signal in response to the detection of the occurrence of the event in a case the acquired pen pressure value indicates that the pen is sliding.

9. The system according to claim 7, wherein the host processor executes a process of setting the vibration control position information in the sensor controller according to an operating system or an application.

10. The system according to claim 7, wherein the sensor controller arranges the vibration control signal in an uplink signal to be transmitted through the sensor, to thereby transmit the vibration control signal.

11. The system according to claim 2, wherein the pen acquires the pen pressure value based on a pressure detected by a pressure sensor that detects the pressure applied to a pen tip.

12. The system according to claim 2, wherein the pen acquires the pen pressure value based on a pressure detected by a pressure sensor that detects the pressure applied to a button provided on a surface of a housing.

13. The system according to claim 1, wherein the pen position detection apparatus is configured to acquire the pen pressure value from the pen signal, and transmit the vibration control signal to activate the haptic element in a case the acquired pen pressure value indicates that the pen is hovering.

14. The system according to claim 13, wherein the pen position detection apparatus is configured to acquire a height of the pen based on a reception strength of the pen signal, and transmit the vibration control signal in a case a value of the acquired height is between a first predetermined value and a second predetermined value larger than the first predetermined value.

15. The system according to claim 13, wherein the pen position detection apparatus is configured to acquire a height of the pen based on a reception strength of the pen signal, and transmit the vibration control signal in a case the pen position and the height indicate that a front end of the pen is positioned in a predetermined space area.

16. The system according to claim 1, wherein the predetermined line segment is a contour line of an electronic ruler displayed in a drawing area.

17. A pen position detection apparatus used along with a pen including a haptic element that is activated in response to a vibration control signal, wherein the pen position detection apparatus is configured to detect a pen signal transmitted from the pen and derive a pen position, detect occurrence of an event that a drawing line indicated by a series of derived pen positions crosses or comes into contact with a predetermined line segment, and transmit the vibration control signal to activate the haptic element in response to the detection of the occurrence of the event.

18. The pen position detection apparatus according to claim 17, wherein the pen position detection apparatus is configured to acquire a pen pressure value from the pen signal, and transmit the vibration control signal to activate the haptic element in response to the detection of the occurrence of the event in a case the acquired pen pressure value indicates that the pen is sliding but not activate the haptic element in a case the acquired pen pressure value does not indicate that the pen is sliding.

19. A method of activating a haptic element built in a pen, the method comprising:

transmitting, by the pen, a pen signal;

detecting, by a pen position detection apparatus, the pen signal to derive a pen position;

detecting, by the pen position detection apparatus, occurrence of an event that a drawing line indicated by a series of derived pen positions crosses or comes into contact with a predetermined line segment;

transmitting, by the pen position detection apparatus, a vibration control signal in response to the detection of the occurrence of the event;

receiving, by the pen, the vibration control signal; and activating, by the pen, the haptic element in response to the received vibration control signal.

20. The method according to claim 19, further comprising:

acquiring, by the pen position detection apparatus, a pen pressure value from the pen signal, wherein, in the transmitting the vibration control signal, the vibration control signal is transmitted in response to the detection of the occurrence of the event in a case the acquired pen pressure value indicates that the pen is sliding, but the vibration control signal is not transmitted in a case the acquired pen pressure value indicates that the pen is not sliding.

* * * * *